(12) United States Patent
Koren et al.

(10) Patent No.: US 10,255,620 B1
(45) Date of Patent: Apr. 9, 2019

(54) FINE PRINT BUILDER

(71) Applicant: Groupon, Inc., Chicago, IL (US)

(72) Inventors: Amit Koren, Chicago, IL (US); Francisco Larrain, Palo Alto, CA (US); Tanya Koshy, Sunnyvale, CA (US); Karan Kaushik, Mountain View, CA (US); Ricardo Zilleruelo, Palo Alto, CA (US); Matias Arenas, Mountain View, CA (US); Kavita Kochar, Chicago, IL (US); Stephen Wooten, Chicago, IL (US)

(73) Assignee: GROUPON, INC., Chicago, IL (US)

( * ) Notice: Subject to any disclaimer, the term of this patent is extended or adjusted under 35 U.S.C. 154(b) by 485 days.

(21) Appl. No.: 13/929,253

(22) Filed: Jun. 27, 2013

(51) Int. Cl.
*G06Q 30/00* (2012.01)
*G06Q 30/02* (2012.01)

(52) U.S. Cl.
CPC .............................. *G06Q 30/0277* (2013.01)

(58) Field of Classification Search
CPC .................. G06Q 30/0241; G06Q 30/0277
USPC ........................................................ 705/14.4
See application file for complete search history.

(56) References Cited

U.S. PATENT DOCUMENTS

| | | |
|---|---|---|
| 5,715,445 A | 2/1998 | Wolfe |
| 5,870,770 A | 2/1999 | Wolfe |
| 5,946,682 A | 8/1999 | Wolfe |
| 5,948,040 A | 9/1999 | DeLorme, et al. |
| 5,970,470 A | 10/1999 | Walker et al. |
| 6,006,252 A | 12/1999 | Wolfe |
| 6,049,778 A | 4/2000 | Walker et al. |
| 6,101,484 A | 8/2000 | Halbert et al. |
| 6,128,599 A | 10/2000 | Walker et al. |
| 6,151,603 A | 11/2000 | Wolfe |

(Continued)

FOREIGN PATENT DOCUMENTS

| | | |
|---|---|---|
| KR | 10-2008-0036829 A | 4/2008 |
| WO | 00/79456 A2 | 12/2000 |

(Continued)

OTHER PUBLICATIONS

U.S. Provisional Patent Application filed Feb. 27, 2013, U.S. Appl. No. 61/770,174.

(Continued)

*Primary Examiner* — Matthew T Sittner
*Assistant Examiner* — Azam A Ansari
(74) *Attorney, Agent, or Firm* — Alston & Bird LLP

(57) ABSTRACT

A method, apparatus, and computer program product are disclosed to improve generation of fine print for promotions. The method includes receiving identifying information that identifies one or more locations and either a product or service, transmitting the identifying information, and receiving, based on the identifying information, information including a set of relevant fine print clause data structures. The method further includes displaying, by a user interface, one or more fine print clauses from the relevant fine print clause data structures and generating, using a processor, a configured fine print data structure based on the displayed fine print clauses and input received via the user interface. Finally, the method includes transmitting the configured fine print data structure. A corresponding apparatus and computer program product are also provided.

12 Claims, 11 Drawing Sheets

(56) References Cited

U.S. PATENT DOCUMENTS

| | | | |
|---|---|---|---|
| 6,154,172 A | 11/2000 | Piccionelli et al. |
| 6,249,772 B1 | 6/2001 | Walker et al. |
| 6,263,351 B1 | 7/2001 | Wolfe |
| 6,269,343 B1 | 7/2001 | Pallakoff |
| 6,292,813 B1 | 9/2001 | Wolfe |
| 6,301,576 B1 | 10/2001 | Wolfe |
| 6,327,573 B1 | 12/2001 | Walker et al. |
| 6,336,131 B1 | 1/2002 | Wolfe |
| 6,341,305 B2 | 1/2002 | Wolfe |
| 6,384,850 B1 | 5/2002 | McNally et al. |
| 6,415,262 B1 | 7/2002 | Walker et al. |
| 6,463,265 B1 | 10/2002 | Cohen et al. |
| 6,477,581 B1 | 11/2002 | Carpenter et al. |
| 6,584,451 B1 | 6/2003 | Shoham et al. |
| 6,604,089 B1 | 8/2003 | Van Horn et al. |
| 6,604,103 B1 | 8/2003 | Wolfe |
| 6,631,356 B1 | 10/2003 | Van Horn et al. |
| 6,754,636 B1 | 6/2004 | Walker et al. |
| 6,778,837 B2 | 8/2004 | Bade et al. |
| 6,812,851 B1 | 11/2004 | Dukach et al. |
| 6,836,476 B1 | 12/2004 | Dunn et al. |
| 6,876,983 B1 | 4/2005 | Goddard et al. |
| 6,901,374 B1 | 5/2005 | Himes |
| 6,918,039 B1 | 7/2005 | Hind et al. |
| 6,928,416 B1 | 8/2005 | Bertash |
| 6,931,130 B1 | 8/2005 | Kraft, IV et al. |
| 6,934,690 B1 | 8/2005 | Van Horn et al. |
| 6,937,868 B2 | 8/2005 | Himmel et al. |
| 6,970,837 B1 | 11/2005 | Walker et al. |
| 6,970,922 B1 | 11/2005 | Spector |
| 6,985,879 B2 | 1/2006 | Walker et al. |
| 7,000,116 B2 | 2/2006 | Bates et al. |
| 7,007,013 B2 | 2/2006 | Davis, II et al. |
| 7,039,603 B2 | 5/2006 | Walker et al. |
| 7,043,526 B1 | 5/2006 | Wolfe |
| 7,072,848 B2 | 7/2006 | Boyd et al. |
| 7,080,029 B1 | 7/2006 | Fallside et al. |
| 7,103,365 B2 | 9/2006 | Myllymaki |
| 7,103,565 B1 | 9/2006 | Vaid |
| 7,103,594 B1 | 9/2006 | Wolfe |
| 7,107,228 B1 | 9/2006 | Walker et al. |
| 7,107,230 B1 | 9/2006 | Halbert et al. |
| 7,113,797 B2 | 9/2006 | Kelley et al. |
| 7,124,099 B2 | 10/2006 | Mesaros |
| 7,124,107 B1 | 10/2006 | Pishevar et al. |
| 7,124,186 B2 | 10/2006 | Piccionelli |
| 7,146,330 B1 | 12/2006 | Alon et al. |
| 7,181,419 B1 | 2/2007 | Mesaros |
| 7,194,427 B1 | 3/2007 | Van Horn et al. |
| 7,236,944 B1 | 6/2007 | Schwartz et al. |
| 7,246,310 B1 | 7/2007 | Wolfe |
| 7,251,617 B1 | 7/2007 | Walker et al. |
| 7,257,604 B1 | 8/2007 | Wolfe |
| 7,263,498 B1 | 8/2007 | Van Horn et al. |
| 7,274,941 B2 | 9/2007 | Cole et al. |
| 7,289,815 B2 | 10/2007 | Gfeller et al. |
| 7,302,638 B1 | 11/2007 | Wolfe |
| 7,318,041 B2 | 1/2008 | Walker et al. |
| 7,340,691 B2 | 3/2008 | Bassett et al. |
| 7,349,879 B2 | 3/2008 | Alsberg et al. |
| 7,363,246 B1 | 4/2008 | Van Horn et al. |
| 7,376,580 B1 | 5/2008 | Walker et al. |
| 7,406,332 B1 | 7/2008 | Gaillard et al. |
| 7,409,429 B2 | 8/2008 | Kaufman et al. |
| 7,428,418 B2 | 9/2008 | Cole et al. |
| 7,430,521 B2 | 9/2008 | Walker et al. |
| 7,433,874 B1 | 10/2008 | Wolfe |
| 7,447,642 B2 | 11/2008 | Bodin |
| 7,467,137 B1 | 12/2008 | Wolfe |
| 7,469,138 B2 | 12/2008 | Dayar et al. |
| 7,472,109 B2 | 12/2008 | Katibah et al. |
| 7,480,627 B1 | 1/2009 | Van Horn et al. |
| 7,529,542 B1 | 5/2009 | Chevion et al. |
| 7,536,385 B1 | 5/2009 | Wolfe |
| 7,539,742 B2 | 5/2009 | Spector |
| 7,577,581 B1 | 8/2009 | Schuyler |
| 7,589,628 B1 | 9/2009 | Brady, Jr. |
| 7,613,631 B2 | 11/2009 | Walker et al. |
| 7,627,498 B1 | 12/2009 | Walker et al. |
| 7,643,836 B2 | 1/2010 | McMahan et al. |
| 7,650,307 B2 | 1/2010 | Stuart |
| 7,668,832 B2 | 2/2010 | Yeh et al. |
| 7,672,897 B2 | 3/2010 | Chung et al. |
| 7,689,468 B2 | 3/2010 | Walker et al. |
| 7,689,469 B1 | 3/2010 | Mesaros |
| 7,693,736 B1 | 4/2010 | Chu et al. |
| 7,693,748 B1 | 4/2010 | Mesaros |
| 7,693,752 B2 | 4/2010 | Jaramillo |
| 7,702,560 B1 | 4/2010 | Wiesehuegel et al. |
| 7,711,604 B1 | 5/2010 | Walker et al. |
| 7,720,743 B1 | 5/2010 | Marks |
| 7,725,480 B2 | 5/2010 | Bassett et al. |
| 7,734,779 B1 | 6/2010 | Piccionelli |
| 7,760,112 B2 | 7/2010 | Bauchot et al. |
| 7,774,453 B2 | 8/2010 | Babu et al. |
| 7,783,279 B2 | 8/2010 | Ramanathan et al. |
| 7,788,281 B2 | 8/2010 | Cole et al. |
| 7,791,487 B2 | 9/2010 | Meyer |
| 7,792,297 B1 | 9/2010 | Piccionelli et al. |
| 7,797,170 B2 | 9/2010 | Bodin |
| 7,848,765 B2 | 12/2010 | Phillips et al. |
| 7,860,753 B2 | 12/2010 | Walker et al. |
| 7,870,229 B2 | 1/2011 | Spector |
| 7,890,364 B2 | 2/2011 | Piccionelli |
| 8,010,417 B2 | 8/2011 | Walker et al. |
| 8,103,519 B2 | 1/2012 | Kramer et al. |
| 8,108,249 B2 | 1/2012 | Schroeder et al. |
| 8,131,619 B1 | 3/2012 | Veselka |
| 8,150,735 B2 | 4/2012 | Walker et al. |
| 8,284,061 B1 | 10/2012 | Dione |
| 8,301,495 B2 | 10/2012 | Mason |
| 8,355,948 B2 | 1/2013 | Mason |
| 8,364,501 B2 | 1/2013 | Rana et al. |
| 8,407,252 B2 | 3/2013 | Bennett et al. |
| 8,650,072 B2 | 2/2014 | Mason et al. |
| 2002/0023010 A1 | 2/2002 | Rittmaster et al. |
| 2002/0065713 A1 | 5/2002 | Awada et al. |
| 2002/0103746 A1 | 8/2002 | Moffett |
| 2002/0116260 A1 | 8/2002 | Szabo et al. |
| 2002/0123930 A1 | 9/2002 | Boyd et al. |
| 2002/0188511 A1 | 12/2002 | Johnson et al. |
| 2003/0004802 A1 | 1/2003 | Callegari |
| 2003/0018559 A1 | 1/2003 | Chung et al. |
| 2003/0055765 A1 | 3/2003 | Bernhardt |
| 2004/0039626 A1 | 2/2004 | Voorhees |
| 2004/0116074 A1 | 6/2004 | Fujii et al. |
| 2004/0117246 A1 | 6/2004 | Applebaum |
| 2004/0148228 A1 | 7/2004 | Kwei |
| 2004/0186789 A1 | 9/2004 | Nakashima |
| 2004/0193489 A1 | 9/2004 | Boyd et al. |
| 2004/0243478 A1 | 12/2004 | Walker et al. |
| 2005/0043996 A1 | 2/2005 | Silver |
| 2005/0075945 A1 | 4/2005 | Hodge et al. |
| 2005/0102156 A1 | 5/2005 | Linduff |
| 2005/0182680 A1 | 8/2005 | Jones et al. |
| 2005/0221841 A1 | 10/2005 | Piccionelli et al. |
| 2005/0245241 A1 | 11/2005 | Durand et al. |
| 2006/0069619 A1 | 3/2006 | Walker et al. |
| 2006/0085259 A1 | 4/2006 | Nicholas et al. |
| 2006/0089882 A1 | 4/2006 | Shimansky |
| 2006/0106678 A1 | 5/2006 | Walker et al. |
| 2006/0161599 A1 | 7/2006 | Rosen |
| 2006/0178932 A1 | 8/2006 | Lang |
| 2006/0195368 A1 | 8/2006 | Walker et al. |
| 2006/0218043 A1 | 9/2006 | Rosenzweig et al. |
| 2006/0224465 A1 | 10/2006 | Walker et al. |
| 2006/0224466 A1 | 10/2006 | Walker et al. |
| 2006/0224467 A1 | 10/2006 | Walker et al. |
| 2006/0235754 A1 | 10/2006 | Walker et al. |
| 2006/0242028 A1 | 10/2006 | Walker et al. |
| 2006/0242036 A1 | 10/2006 | Walker et al. |
| 2006/0265289 A1 | 11/2006 | Bellissimo |
| 2007/0061209 A1 | 3/2007 | Jackson |
| 2007/0061220 A1 | 3/2007 | Vaid |

(56) References Cited

U.S. PATENT DOCUMENTS

| | | |
|---|---|---|
| 2007/0150354 A1 | 6/2007 | Walker et al. |
| 2007/0150371 A1 | 6/2007 | Gangji |
| 2007/0156529 A1 | 7/2007 | Walker et al. |
| 2007/0198360 A1 | 8/2007 | Rogers et al. |
| 2007/0208625 A1 | 9/2007 | Walker et al. |
| 2007/0225077 A1 | 9/2007 | Piccionelli |
| 2007/0280269 A1 | 12/2007 | Rosenberg |
| 2007/0281692 A1 | 12/2007 | Bucher et al. |
| 2007/0288330 A1 | 12/2007 | Vaid |
| 2008/0004888 A1 | 1/2008 | Davis et al. |
| 2008/0015938 A1 | 1/2008 | Haddad et al. |
| 2008/0027810 A1 | 1/2008 | Lerner et al. |
| 2008/0040211 A1 | 2/2008 | Walker et al. |
| 2008/0052186 A1 | 2/2008 | Walker et al. |
| 2008/0052189 A1 | 2/2008 | Walker et al. |
| 2008/0065490 A1 | 3/2008 | Novick et al. |
| 2008/0065565 A1 | 3/2008 | Walker et al. |
| 2008/0071622 A1 | 3/2008 | Walker et al. |
| 2008/0097857 A1 | 4/2008 | Walker et al. |
| 2008/0133336 A1 | 6/2008 | Altman et al. |
| 2008/0154714 A1 | 6/2008 | Liu et al. |
| 2008/0162318 A1 | 7/2008 | Butler et al. |
| 2008/0167991 A1 | 7/2008 | Carlson et al. |
| 2008/0201232 A1 | 8/2008 | Walker et al. |
| 2008/0208663 A1 | 8/2008 | Walker et al. |
| 2008/0208744 A1 | 8/2008 | Arthur et al. |
| 2008/0242514 A1 | 10/2008 | Piccionelli et al. |
| 2009/0006182 A1* | 1/2009 | Gammon ............... G06Q 10/04 |
| | | 705/7.31 |
| 2009/0024450 A1 | 1/2009 | Chen et al. |
| 2009/0024484 A1 | 1/2009 | Walker et al. |
| 2009/0027286 A1 | 1/2009 | Ohishi et al. |
| 2009/0030776 A1 | 1/2009 | Walker et al. |
| 2009/0037286 A1 | 2/2009 | Foster |
| 2009/0070263 A1 | 3/2009 | Davis et al. |
| 2009/0094109 A1 | 4/2009 | Aaronson et al. |
| 2009/0125414 A1 | 5/2009 | Kleinrock et al. |
| 2009/0150218 A1 | 6/2009 | Brunner et al. |
| 2009/0167553 A1 | 7/2009 | Hong et al. |
| 2009/0192935 A1 | 7/2009 | Griffin et al. |
| 2009/0307067 A1 | 12/2009 | Obermeyer |
| 2009/0313109 A1 | 12/2009 | Bous et al. |
| 2010/0049601 A1 | 2/2010 | Walker et al. |
| 2010/0063870 A1 | 3/2010 | Anderson et al. |
| 2010/0070303 A1 | 3/2010 | Massoumi et al. |
| 2010/0076832 A1 | 3/2010 | Cha |
| 2010/0082481 A1 | 4/2010 | Lin et al. |
| 2010/0094701 A1 | 4/2010 | Ghosh et al. |
| 2010/0114132 A1 | 5/2010 | Piccionelli et al. |
| 2010/0146604 A1 | 6/2010 | Piccionelli |
| 2010/0185465 A1 | 7/2010 | Rana et al. |
| 2010/0205004 A1 | 8/2010 | Aldrich |
| 2010/0241513 A1 | 9/2010 | Prasad et al. |
| 2010/0287103 A1 | 11/2010 | Mason |
| 2011/0029362 A1 | 2/2011 | Roeding et al. |
| 2011/0029363 A1 | 2/2011 | Gillenson et al. |
| 2011/0035266 A1 | 2/2011 | Patterson |
| 2011/0040609 A1 | 2/2011 | Hawkins et al. |
| 2011/0054996 A1 | 3/2011 | Spector |
| 2011/0099082 A1 | 4/2011 | Walker |
| 2011/0153400 A1 | 6/2011 | Averbuch |
| 2011/0173096 A1 | 7/2011 | Bui |
| 2011/0218911 A1 | 9/2011 | Spodak |
| 2011/0231321 A1 | 9/2011 | Milne |
| 2011/0238499 A1 | 9/2011 | Blackhurst et al. |
| 2011/0313840 A1* | 12/2011 | Mason ................... G06Q 30/02 |
| | | 705/14.35 |
| 2011/0313867 A9 | 12/2011 | Silver |
| 2012/0016745 A1 | 1/2012 | Hendrickson |
| 2012/0030002 A1 | 2/2012 | Bous et al. |
| 2012/0030066 A1 | 2/2012 | Stringfellow et al. |
| 2012/0036042 A1 | 2/2012 | Graylin et al. |
| 2012/0054031 A9 | 3/2012 | Sammon |
| 2012/0088487 A1 | 4/2012 | Khan |
| 2012/0095852 A1 | 4/2012 | Lloyd et al. |
| 2012/0101889 A1 | 4/2012 | Kurata et al. |
| 2012/0150603 A1 | 6/2012 | Bennett et al. |
| 2012/0172062 A1 | 7/2012 | Altman et al. |
| 2012/0173350 A1 | 7/2012 | Robson |
| 2012/0209730 A1 | 8/2012 | Garrett |
| 2012/0254020 A1 | 10/2012 | Debow |
| 2012/0259711 A1 | 10/2012 | Jabbawy |
| 2012/0303434 A1 | 11/2012 | Postrel |
| 2013/0024364 A1 | 1/2013 | Katzin |
| 2013/0085804 A1 | 4/2013 | Ferro |
| 2013/0124281 A1 | 5/2013 | Evans et al. |
| 2013/0254104 A1 | 9/2013 | Fernandez |
| 2013/0275242 A1 | 10/2013 | Ramaratnam et al. |
| 2013/0317894 A1* | 11/2013 | Zhu ..................... G06Q 30/0211 |
| | | 705/14.13 |
| 2014/0046757 A1 | 2/2014 | Kahn et al. |
| 2014/0095232 A1 | 4/2014 | Shiva et al. |
| 2014/0122200 A1* | 5/2014 | Granville ........... G06Q 30/0212 |
| | | 705/14.14 |
| 2014/0207584 A1 | 7/2014 | Wicha et al. |
| 2015/0046271 A1 | 2/2015 | Scholl et al. |

FOREIGN PATENT DOCUMENTS

| | | |
|---|---|---|
| WO | 00/79495 A2 | 12/2000 |
| WO | 01/08024 A2 | 2/2001 |
| WO | 01/11483 A2 | 2/2001 |
| WO | 01/50301 A2 | 7/2001 |
| WO | 2009/094385 A2 | 7/2009 |
| WO | 2011/112752 A1 | 9/2011 |
| WO | 2014/052882 A2 | 4/2014 |
| WO | 2014/062229 A1 | 4/2014 |
| WO | 2014/062230 A1 | 4/2014 |

OTHER PUBLICATIONS

U.S. Provisional Application System, filed May 17, 2013; In re: Kahn et al., entitled Unified Payment and Return on Investment System, U.S. Appl. No. 61/824,850.

U.S. Provisional Application filed Mar. 30, 2012, In re: Kim entitled "Generating Deal Offers and Providing Analytics Data", U.S. Appl. No. 61/618,338.

U.S. Provisional Application filed Jun. 18, 2012, In re: Kim et al. entitled Facilitating Consumer Payments and Redemptions of Deal Offers, U.S. Appl. No. 61/661,291.

U.S. Provisional Application filed Aug. 13, 2012, In re: Shariff et al. entitled Unified payment and Return on Investment System, U.S. Appl. No. 61/682,762.

U.S. Patent Application filed Sep. 28, 2012, In re: Shiva entitled "Scheduling Appointments With Deal Offers", U.S. Appl. No. 13/631,313.

U.S. Patent Application filed Mar. 15, 2013, U.S. Appl. No. 13/832,804.

Staff, "ActBig.com muscles in on group buying power", RedHerring.com, Oct. 13,1999.

Rueb, Emily S., "Group Buying, Better Together", The New York Times City Blog, Feb. 16, 2010, 3 pgs.

PCT Written Openion of the International Searching Authority for Application PCT/US2013/033169 dated Jun. 10, 2013.

PCT international Search Report for Application PCT/US2013/033169 dated Jun. 10, 2013.

PCT International Search Report and Written Opinion of the International Searching Authority for application PCT/US2013/062389 dated May 27, 2014.

PCT international Search Report and Written Openion of the International Searching Authority for Application PCT/US2013/033145 dated Jun. 21, 2013.

PCT international Preliminary Report on Patentability for Application PCT/US2013/062389 dated Mar. 31, 2015.

PCT international Preliminary Report on Patentability for Application PCT/US2013/033169 dated Apr. 21, 2015.

PCT international Preliminary Report on Patentability for Application PCT/US2013/033145, dated Apr. 21, 2015.

Krishnan S. Anand and Ravi Aron (OPIM Department, The Wharton School, University of Pennsylvania), Group Buying on the Web: A

(56) References Cited

OTHER PUBLICATIONS

Comparison of Price Discovery Mechanisms, Management Science, vol. 49, No. 11, pp. 1546-1562, Nov. 2003.

Kauffman, Robert J. et al., "Bid Together, Buy Together: On The Efficacy Of Group-Buying Business Models In Internet Based Selling", paper prepared for the 5th Annual University of Minnesota Electronic Commerce conference, Mar. 27-28, 2001, Carlson School of Management, University of Minnesota, MN, 44 pgs.

International Search Report and Written Opinion for Application No. PCT/US2012.2/027616 dated Sep. 27, 2012.

Editor, "Technology Drives ActBig 'Next Generation' GroupBuying Application", Market Wire, Feb. 29, 2005.

Bermant, Charles, "ActBig: Save BiG", Internetnews.com. Nov. 16, 1999, 3 pgs.

Alan S. Davis "Group Buying on the Internet", Seminar Presentation Slides, University of Minnesota, MIS Research Denter, Mar. 10, 2006.

"Next Step for Groupon Scheduler," Groublogpon—The Sereous Blog of Froupon, Mar. 18, 2012. [Retrieved from the Internet Mar. 26, 2012: <http://www.groupon.com/blog/cities.next-step-groupon-scheduler/>.

\* cited by examiner

700

Fine Print & Redemption Instructions

Required Fine Print — 704 — 702
☑ Valid only for [option] purchased.

Recommended Fine Print

☐ Limit number per person, may buy number additional as gift

☐ Limit number per visit

☐ May redeem across multiple visits

☐ Appointment required

☐ 24 Hour cancellation cancellation notice required.

— 706

View non-recommended fine print — 708

— 710
Redemption Instructions

Instructions

☑ *Remember--there's no discount on great service. Please be sure to tip on the total bill (Groupon value plus anything else you order).

Redemption Locations ?
☑ 1165 North Clark Street, Chicago, IL 60610
☑ 123 Main Street, Chicago, IL 60606
— 712

+ Create new location
— 714

Back    Save & Continue

Fig. 7

FINE PRINT BUILDER

TECHNOLOGICAL FIELD

Example embodiments of the present invention relate generally to document generation and, more particularly, to a method and apparatus for improving the generation of fine print for promotions.

BACKGROUND

Applicant has discovered problems with current methods for generating fine print in documents, such as promotions. Through applied effort, ingenuity, and innovation, Applicant has solved many of these identified problems by developing a solution that is embodied by the present invention, which is described in detail below.

BRIEF SUMMARY

Accordingly, a method, apparatus, and computer program product are provided for improving the generation of fine print for promotions.

In a first example embodiment, a method is provided for generating fine print for a promotion that is offered by a promotion and marketing service. The method includes receiving, from a user device, information identifying one or more locations at which a customer may redeem the promotion and either a product or a service for which the promotion may be redeemed and identifying, by a processor and based on the received information, relevant fine print clause data structures stored in a memory, wherein the fine print clause data structures are identified based on a predefined association between the promotion and the relevant fine print clause data structures. The method further includes transmitting the relevant fine print clause data structures to the user device, and receiving, from the user device, a configured fine print data structure for the promotion based on the transmitted relevant fine print clause data structures, wherein the promotion is generated for display by the promotion and marketing service. The method may further include generating, by the processor, a promotion including a fine print string based on the configured fine print data structure.

In one embodiment, identifying relevant fine print clause data structures stored in the memory may include searching the memory for one or more mapping data structures associated with the location and either the product or the service, receiving search results comprising the one or more mapping data structures, retrieving fine print clause data structures listed in the one or more mapping data structures, and identifying the retrieved fine print clause data structures. In one such embodiment, the method may further include retrieving from the one or more mapping data structures, for each fine print clause data structure, presentation information indicating whether a fine print clause associated with the fine print clause data structure is required for the promotion, selected for inclusion in the promotion, or should be shown to a user for selection, wherein transmitting the relevant fine print clause data structures to the user device includes transmitting the presentation information for each fine print clause data structure.

In another embodiment, at least one fine print clause data structure includes configurable text. In yet another embodiment, each fine print clause data structure includes fields indicating default instructions regarding whether an associated fine print clause is required for the promotion, selected for inclusion in the promotion, or should be shown to a user for selection. In a further embodiment, each fine print clause data structure includes a rating indicating an impact upon promotion performance. In this regard, the rating may be calculated based on historical performance of previously offered promotions.

In another example embodiment, an apparatus is provided for generating fine print for a promotion. The apparatus includes a processor and a memory, the memory storing computer program code that, when executed by the processor, causes the apparatus to receive, from a user device, information identifying one or more locations at which a customer may redeem the promotion and either a product or a service for which the promotion may be redeemed, and identify, based on the received information, relevant fine print clause data structures stored in a memory. The computer program code, when executed by the processor, further causes the apparatus to transmit the relevant fine print clause data structures to the user device, and receive, from the user device, a configured fine print data structure for the promotion based on the transmitted relevant fine print clause data structures, wherein the promotion is generated for display by the promotion and marketing service. The computer program code, when executed by the processor, may also cause the apparatus to generate a promotion including a fine print string based on the configured fine print data structure.

In one embodiment, the computer program code, when executed by the processor, further causes the apparatus to identify relevant fine print clause data structures stored in the memory by searching the memory for one or more mapping data structures associated with the location and either the product or the service, receiving search results comprising the one or more mapping data structures, retrieving fine print clause data structures listed in the one or more mapping data structures, and identifying the retrieved fine print clause data structures. In one such embodiment, the computer program code, when executed by the processor, further causes the apparatus to retrieve from the one or more mapping data structures, for each fine print clause data structure, presentation information indicating whether a fine print clause associated with the fine print clause data structure is required for the promotion, selected for inclusion in the promotion, or should be shown to a user for selection, wherein transmitting the relevant fine print clause data structures to the user device includes transmitting the presentation information for each fine print clause data structure.

In another embodiment, at least one fine print clause data structure includes configurable text. In yet another embodiment, each fine print clause data structure includes fields indicating default instructions regarding whether an associated fine print clause is required for the promotion, selected for inclusion in the promotion, or should be shown to a user for selection. In a further embodiment, each fine print clause data structure includes a rating indicating an impact upon promotion performance. In this regard, the rating may be calculated based on historical performance of previously offered promotions.

In another example embodiment, a computer program product is provided for generating fine print for a promotion. The computer program product includes a computer-readable storage medium storing computer program code that, when executed by an apparatus, causes the apparatus to receive, from a user device, information identifying one or more locations at which a customer may redeem the promotion and either a product or a service for which the promotion may be redeemed, and identify, based on the received information, relevant fine print clause data structures stored in a memory. The computer program code, when executed by the processor, further causes the apparatus to transmit the relevant fine print clause data structures to the user device, and receive, from the user device, a configured fine print data structure for the promotion based on the transmitted relevant fine print clause data structures, wherein the promotion is generated for display by the promotion and marketing service. The computer program code, when executed by the processor, may also cause the apparatus to generate a promotion including a fine print string based on the configured fine print data structure.

In one embodiment, the computer program code, when executed by the processor, further causes the apparatus to identify relevant fine print clause data structures stored in the memory by searching the memory for one or more mapping data structures associated with the location and either the product or the service, receiving search results comprising the one or more mapping data structures, retrieving fine print clause data structures listed in the one or more mapping data structures, and identifying the retrieved fine print clause data structures. In one such embodiment, the computer program code, when executed by the processor, further causes the apparatus to retrieve from the one or more mapping data structures, for each fine print clause data structure, presentation information indicating whether a fine print clause associated with the fine print clause data structure is required for the promotion, selected for inclusion in the promotion, or should be shown to a user for selection, wherein transmitting the relevant fine print clause data structures to the user device includes transmitting the presentation information for each fine print clause data structure.

In another embodiment, at least one fine print clause data structure includes configurable text. In yet another embodiment, each fine print clause data structure includes fields indicating default instructions regarding whether an associated fine print clause is required for the promotion, selected for inclusion in the promotion, or should be shown to a user for selection. In a further embodiment, each fine print clause data structure includes a rating indicating an impact upon promotion performance. In this regard, the rating may be calculated based on historical performance of previously offered promotions.

In yet another example embodiment, a method is provided for generating fine print for a promotion. The method includes receiving identifying information that identifies one or more locations at which a customer may redeem the promotion and either a product or service for which the promotion may be redeemed and transmitting the identifying information. The method further includes receiving, based on the identifying information, information including a set of relevant fine print clause data structures, displaying, by a user interface, one or more fine print clauses from the relevant fine print clause data structures, generating, using a processor, a configured fine print data structure for the promotion based on the displayed fine print clauses and input received via the user interface, and transmitting the configured fine print data structure.

In one embodiment, the method may further include receiving, by the user interface, an additional location, and transmitting updated identifying information including the additional location, wherein receiving the relevant fine print clause data structures is further based on the additional location.

In another embodiment, generating the configured fine print data structure for the promotion includes receiving, by the user interface, input indicating selection of one or more of the displayed fine print clauses, in an instance in which one or more of the selected fine print clauses includes configurable text, receiving, by the user interface, input configuring the configurable text, and creating the configured fine print data structure including the selected fine print clauses. In this regard, the method may further include receiving, by the user interface, redemption instructions, wherein the configured fine print data structure includes the redemption instructions.

In yet another embodiment, displaying, by the user interface, the one or more fine print clauses from the relevant fine print clause data structures comprises determining from the received information, for each fine print clause data structure, whether an associated fine print clause is required for the promotion, selected for inclusion in the promotion, or should be shown for selection by a user, and displaying, by the user interface, the fine print clauses that are required for the promotion, selected for inclusion in the promotion, or should be shown to a user for selection.

In another embodiment, the method further includes determining from the relevant fine print clause data structures, a rating of each of the fine print clauses, and adjusting prominence of the fine print clauses displayed by the user interface based on the ratings of each of the fine print clauses.

In another example embodiment, an apparatus is provided for generating fine print for a promotion. The apparatus includes a processor and a memory, the memory storing computer program code that, when executed by the processor, causes the apparatus to receive identifying information that identifies one or more locations at which a customer may redeem the promotion and either a product or service for which the promotion may be redeemed and transmit the identifying information. The computer program code, when executed by the processor, further causes the apparatus to receive, based on the identifying information, information including a set of relevant fine print clause data structures, display, by a user interface, one or more fine print clauses from the relevant fine print clause data structures, generate a configured fine print data structure for the promotion based on the displayed fine print clauses and input received via the user interface, and transmit the configured fine print data structure.

In one embodiment, the computer program code, when executed by the processor, further causes the apparatus to receive, by the user interface, an additional location, and transmit updated identifying information including the additional location, wherein receiving the relevant fine print clause data structures is further based on the additional location.

In another embodiment, generating the configured fine print data structure for the promotion includes receiving, by the user interface, input indicating selection of one or more of the displayed fine print clauses, in an instance in which one or more of the selected fine print clauses includes configurable text, receiving, by the user interface, input configuring the configurable text, and creating the configured fine print data structure including the selected fine print clauses. In this regard, the computer program code, when executed by the processor, may further cause the apparatus to receive, by the user interface, redemption instructions, wherein the configured fine print data structure includes the redemption instructions.

In yet another embodiment, displaying, by the user interface, the one or more fine print clauses from the relevant fine print clause data structures includes determining from the received information, for each fine print clause data structure, whether an associated fine print clause is required for the promotion, selected for inclusion in the promotion, or should be shown for selection by a user, and displaying, by the user interface, the fine print clauses that are required for the promotion, selected for inclusion in the promotion, or should be shown to a user for selection.

In another embodiment, the computer program code, when executed by the processor, further causes the apparatus to determine from the relevant fine print clause data structures, a rating of each of the fine print clauses, and adjust prominence of the fine print clauses displayed by the user interface based on the ratings of each of the fine print clauses.

In another example embodiment, a computer program product is provided for generating fine print for a promotion. The computer program product includes a computer-readable storage medium storing computer program code that, when executed by an apparatus, causes the apparatus to receive identifying information that identifies one or more locations at which a customer may redeem the promotion and either a product or service for which the promotion may be redeemed and transmit the identifying information. The computer program code, when executed by the processor, further causes the apparatus to receive, based on the identifying information, information including a set of relevant fine print clause data structures, display, by a user interface, one or more fine print clauses from the relevant fine print clause data structures, generate a configured fine print data structure for the promotion based on the displayed fine print clauses and input received via the user interface, and transmit the configured fine print data structure.

In one embodiment, the computer program code, when executed by the processor, further causes the apparatus to receive, by the user interface, an additional location, and transmit updated identifying information including the additional location, wherein receiving the relevant fine print clause data structures is further based on the additional location.

In another embodiment, generating the configured fine print data structure for the promotion includes receiving, by the user interface, input indicating selection of one or more of the displayed fine print clauses, in an instance in which one or more of the selected fine print clauses includes configurable text, receiving, by the user interface, input configuring the configurable text, and creating the configured fine print data structure including the selected fine print clauses. In this regard, the computer program code, when executed by the processor, may further cause the apparatus to receive, by the user interface, redemption instructions, wherein the configured fine print data structure includes the redemption instructions.

In yet another embodiment, displaying, by the user interface, the one or more fine print clauses from the relevant fine print clause data structures includes determining from the received information, for each fine print clause data structure, whether an associated fine print clause is required for the promotion, selected for inclusion in the promotion, or should be shown for selection by a user, and displaying, by the user interface, the fine print clauses that are required for the promotion, selected for inclusion in the promotion, or should be shown to a user for selection.

In another embodiment, the computer program code, when executed by the processor, further causes the apparatus to determine from the relevant fine print clause data structures, a rating of each of the fine print clauses, and adjust prominence of the fine print clauses displayed by the user interface based on the ratings of each of the fine print clauses.

In another example embodiment, a method is provided for dynamically updating fine print clause data structures. The method includes identifying a fine print clause data structure, receiving data regarding historical performance of previously offered promotions that have included the fine print clause data structure, rating, by a processor, a performance impact of the fine print clause data structure based on the data regarding historical performance of the previously offered promotions, and storing the rating in the fine print clause data structure.

In one embodiment, rating the performance impact of the fine print clause data structures includes determining the previously offered promotions that include the fine print clause data structure, evaluating success of the previously offered promotions that include the fine print clause data structure, calculating a significance of the fine print clause data structure to the evaluated success, and updating the fine print clause data structure to include a rating based on the calculated significance.

In another example embodiment, an apparatus is provided for dynamically updating fine print clause data structures. The apparatus includes a processor and a memory, the memory storing computer program code that, when executed by the processor, causes the apparatus to identify a fine print clause data structure, receive data regarding historical performance of previously offered promotions that have included the fine print clause data structure, rate a performance impact of the fine print clause data structure based on the data regarding historical performance of the previously offered promotions, and store the rating in the fine print clause data structure.

In one embodiment, rating, the performance impact of the fine print clause data structures includes determining the previously offered promotions that include the fine print clause data structure, evaluating success of the previously offered promotions that include the fine print clause data structure, calculating a significance of the fine print clause data structure to the evaluated success, and updating the fine print clause data structure to include a rating based on the calculated significance.

In another example embodiment, a computer program product is provided for dynamically updating fine print clause data structures. The computer program product includes a computer-readable storage medium storing computer program code that, when executed by an apparatus, causes the apparatus to identify a fine print clause data structure, receive data regarding historical performance of previously offered promotions that have included the fine print clause data structure, rate a performance impact of the fine print clause data structure based on the data regarding historical performance of the previously offered promotions, and store the rating in the fine print clause data structure.

In one embodiment, rating the performance impact of the fine print clause data structures includes determining the previously offered promotions that include the fine print clause data structure, evaluating success of the previously offered promotions that include the fine print clause data structure, calculating a significance of the fine print clause data structure to the evaluated success, and updating the fine print clause data structure to include a rating based on the calculated significance.

In yet another example embodiment, a method is provided for generating a set of fine print clause data structures. The method includes identifying free-text fine print clauses from a set of previously offered promotions, extracting, by a processor, free-text fine print clauses from the set of previously offered promotions, identifying common free-text fine print clauses not available in existing fine print data structures, and creating fine print clause data structures for each common free-text fine print clause.

In one embodiment, the method further includes associating each fine print clause data structure with one or more locations and either a product or service of each previously offered promotion that includes the fine print clause data structure. In another embodiment, the method further includes, for each fine print clause data structure, updating fields of the fine print clause data structure to indicate default instructions regarding whether its associated fine print clause is required for a promotion, selected for inclusion in the promotion, or should be shown to a user for selection.

In another example embodiment, an apparatus is provided for generating a set of fine print clause data structures. The apparatus includes a processor and a memory, the memory storing computer program code that, when executed by the processor, causes the apparatus to identify free-text fine print clauses from a set of previously offered promotions, extract free-text fine print clauses from the set of previously offered promotions, identify common free-text fine print clauses not available in existing fine print data structures, and create fine print clause data structures for each common free-text fine print clause In one embodiment, the computer program code, when executed by the processor, further causes the apparatus to associate each fine print clause data structure with one or more locations and either a product or service of each previously offered promotion that includes the fine print clause data structure. In another embodiment, the computer program code, when executed by the processor, further causes the apparatus to, for each fine print clause data structure, update fields of the fine print clause data structure to indicate default instructions regarding whether its associated fine print clause is required for a promotion, selected for inclusion in the promotion, or should be shown to a user for selection.

In another example embodiment, a computer program product is provided for generating a set of fine print clause data structures. The computer program product includes a computer-readable storage medium storing computer program code that, when executed by an apparatus, causes the apparatus to identify free-text fine print clauses from a set of previously offered promotions, extract fine print clauses from the set of previously offered promotions, identify common free-text fine print clauses not available in existing fine print data structures, and create fine print clause data structures for each common free-text fine print clause.

In one embodiment, the computer program code, when executed by the apparatus, further causes the apparatus to associate each fine print clause data structure with one or more locations and either a product or service of each previously offered promotion that includes the fine print clause data structure. In another embodiment, the computer program code, when executed by the apparatus, further causes the apparatus to, for each fine print clause data structure, update fields of the fine print clause data structure to indicate default instructions regarding whether its associated fine print clause is required for a promotion, selected for inclusion in the promotion, or should be shown to a user for selection.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
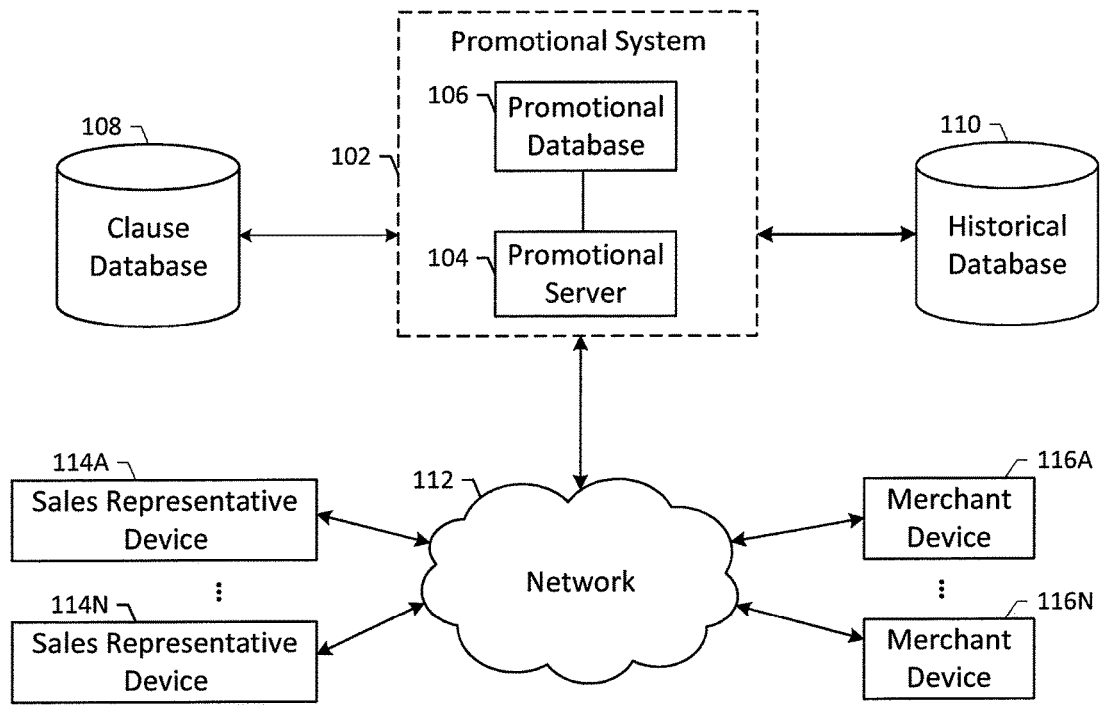
Figure 2:
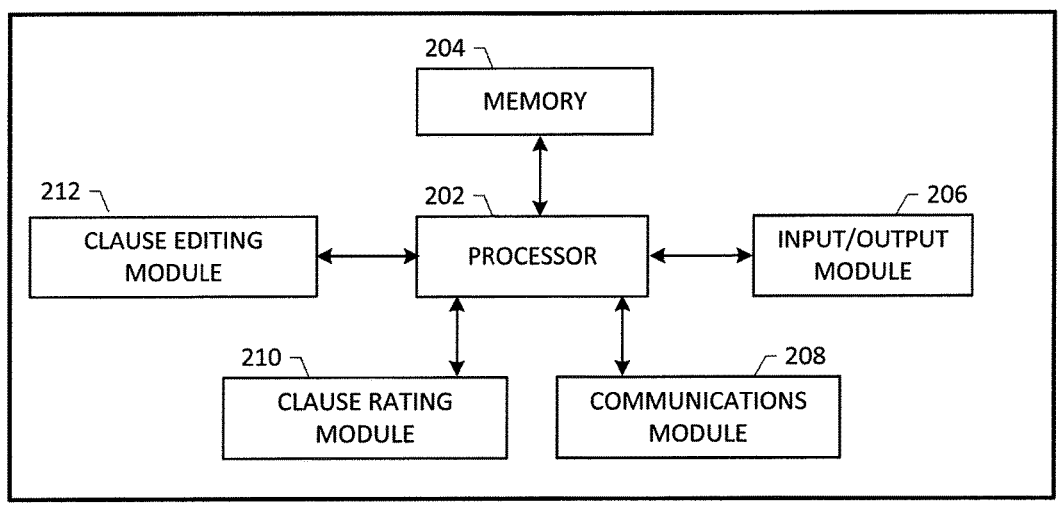
Figure 3:
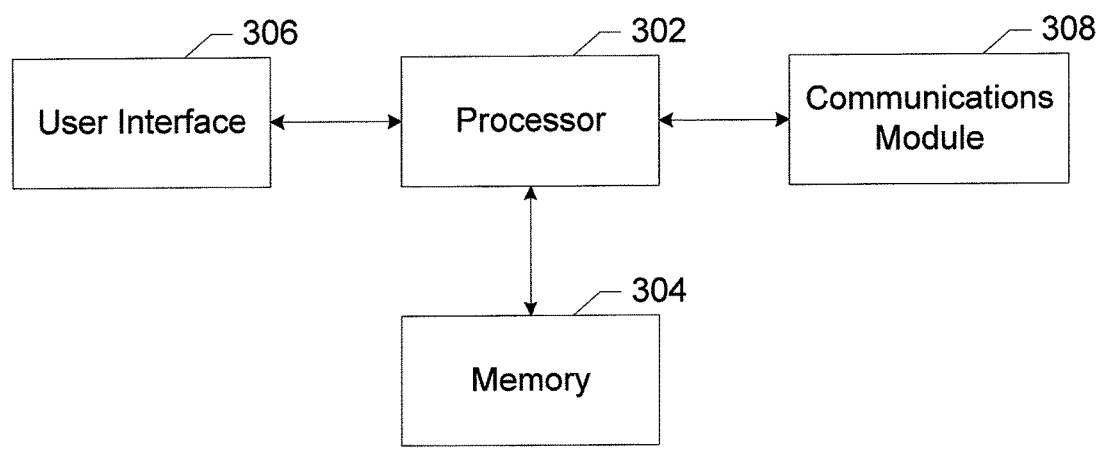
Figure 4A:
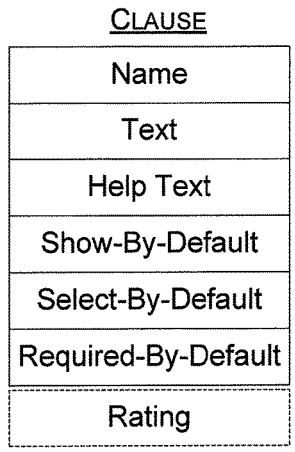
Figure 4B:
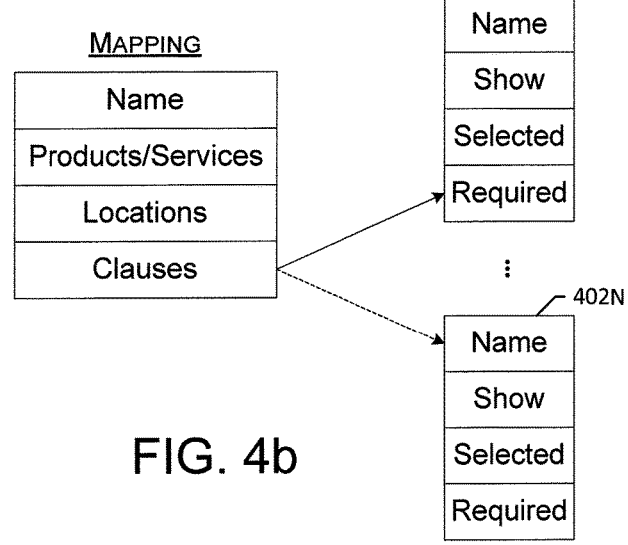
Figure 4C:
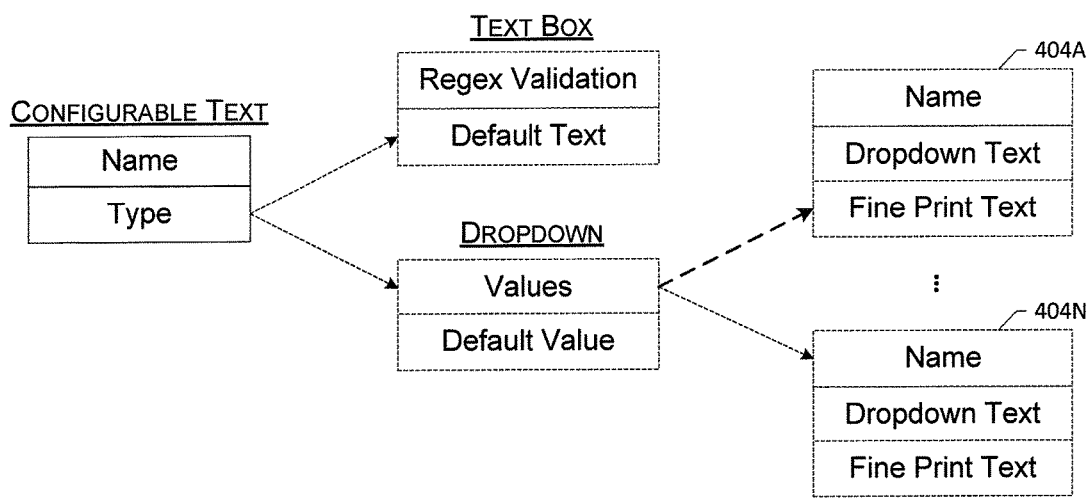
Figure 5:
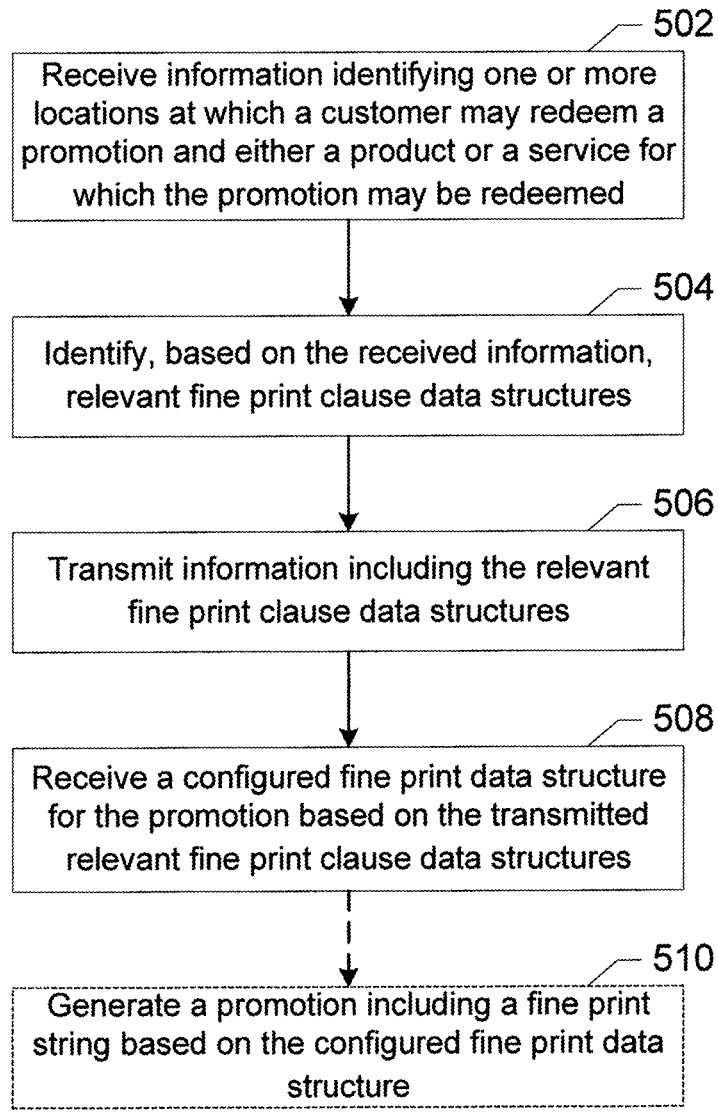
Figure 6:
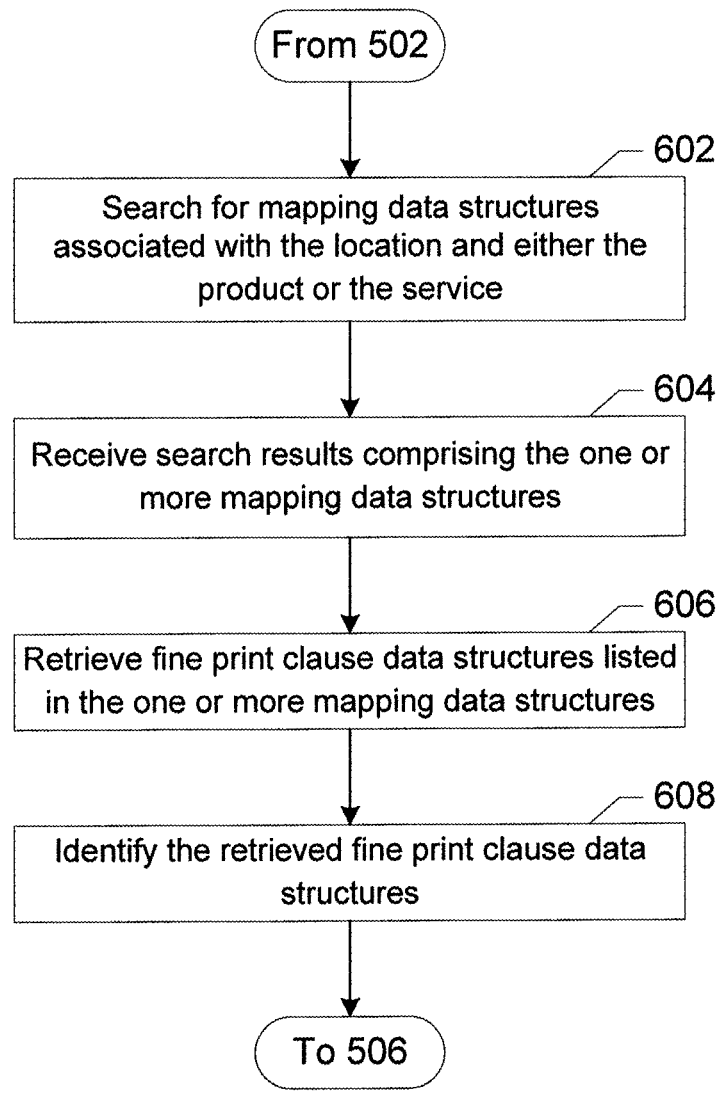
Figure 8:
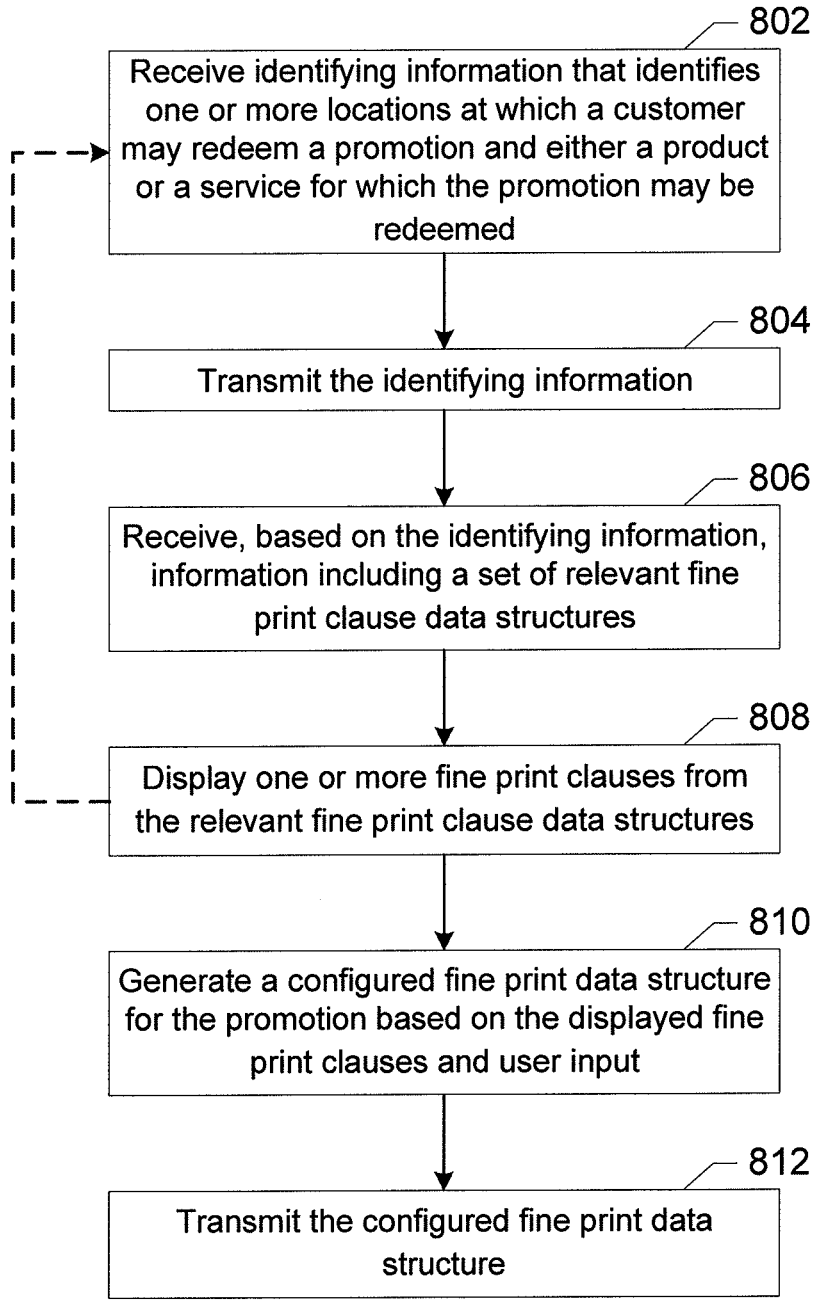
Figure 9:
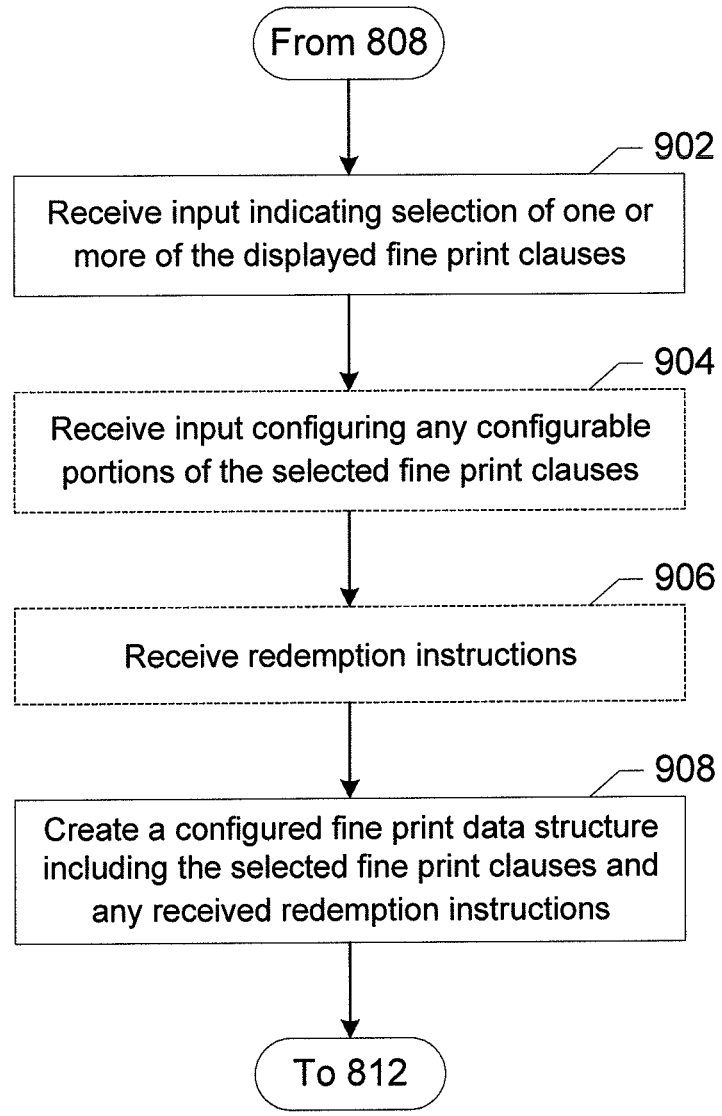
Figure 10:
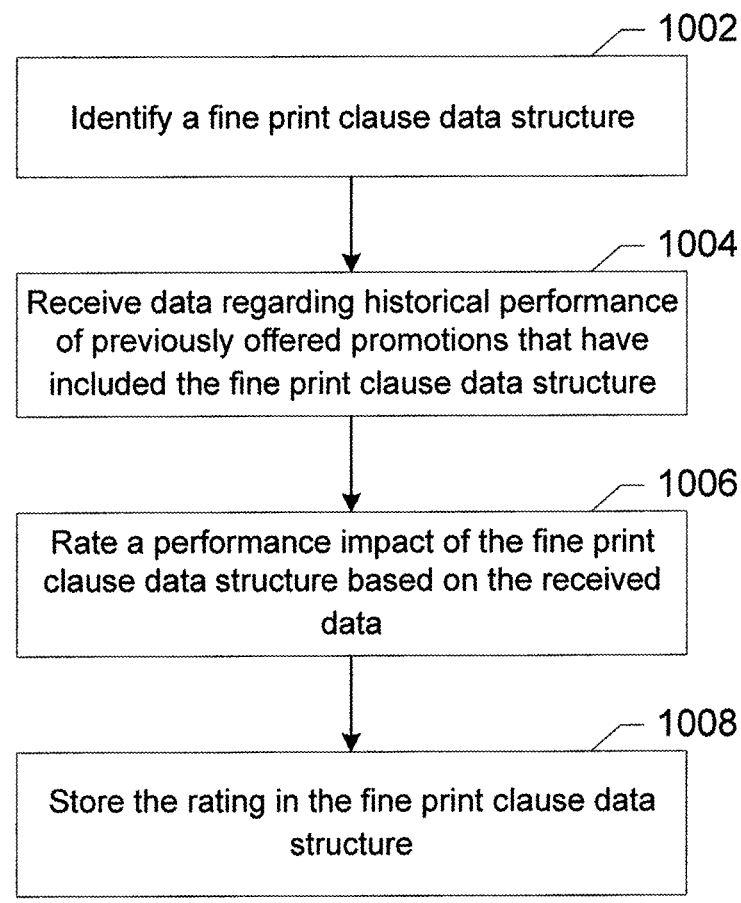
Figure 11:
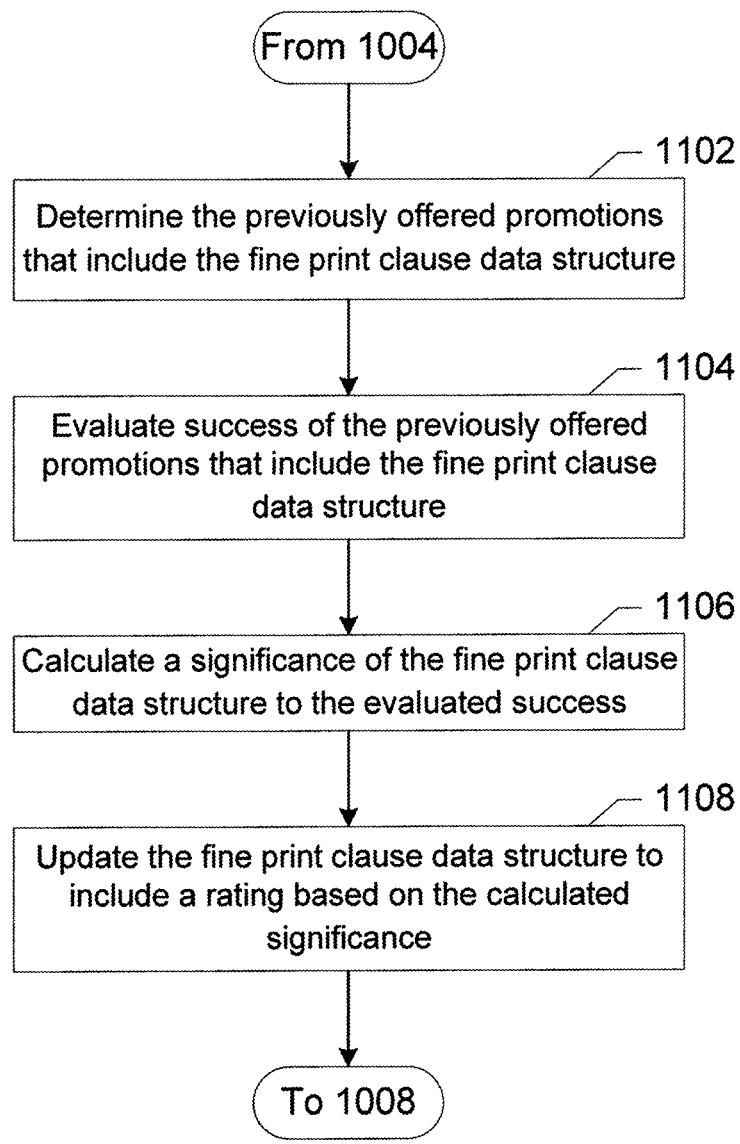
Figure 12:
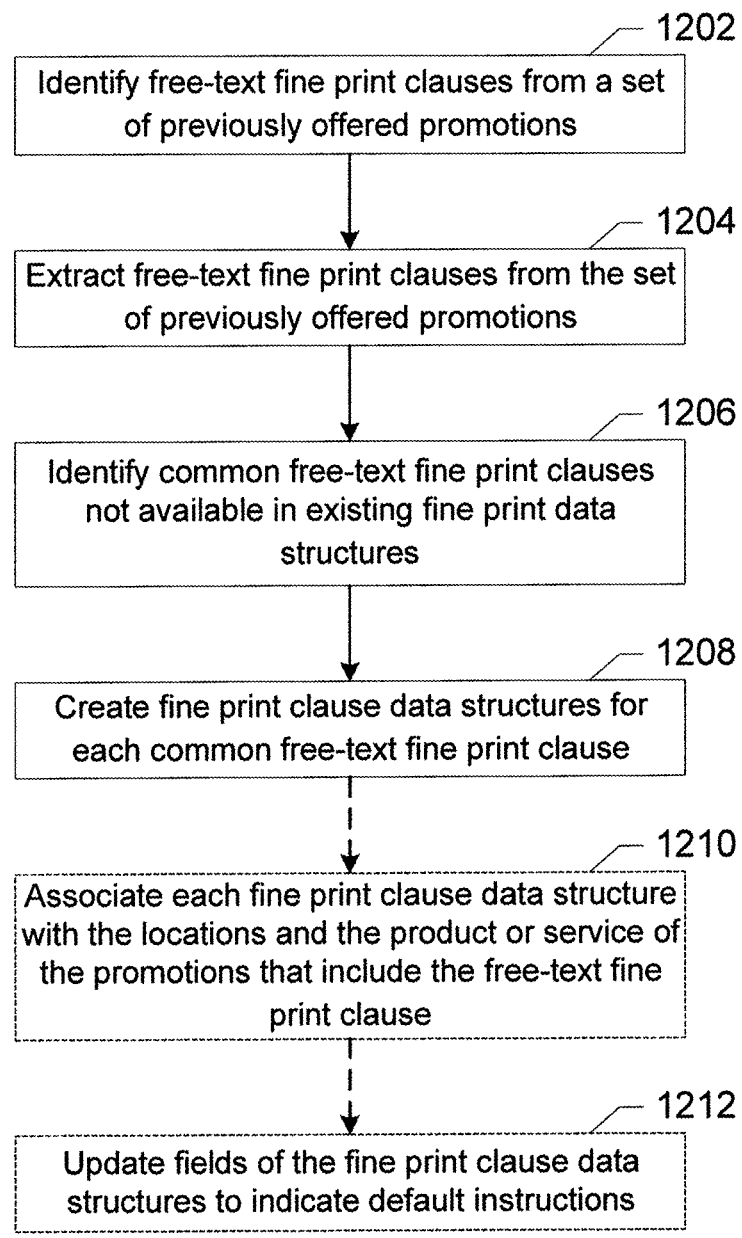

Having thus described certain example embodiments of the present disclosure in general terms, reference will now be made to the accompanying drawings, which are not necessarily drawn to scale, and wherein:

FIG. 1 illustrates an example system within which embodiments of the present invention may operate;

FIG. 2 illustrates a block diagram showing an example device for use in a promotional server, in accordance with some example embodiments of the present invention;

FIG. 3 illustrates a block diagram showing an example device for use by a sales representative or merchant, in accordance with an example embodiment of the present invention;

FIG. 4a illustrates a block diagram of an example fine print clause data structure, in accordance with some example embodiments;

FIG. 4b illustrates a block diagram of an example mapping data structure, in accordance with some example embodiments;

FIG. 4c illustrates a block diagram of an example configurable text element for use in a fine print clause data structure, in accordance with some example embodiments;

FIG. 5 illustrates a flowchart describing example operations for generating fine print for a promotion from the perspective of a promotion and marketing service, in accordance with some example embodiments;

FIG. 6 illustrates a flowchart describing additional example operations for generating fine print for a promotion from the perspective of a promotion and marketing service, in accordance with some example embodiments;

FIG. 7 illustrates an example user interface for customizing promotion fine print, in accordance with some example embodiments;

FIG. 8 illustrates a flowchart describing example operations for generating fine print for a promotion from the perspective of a sales representative or merchant, in accordance with some example embodiments;

FIG. 9 illustrates a flowchart describing additional example operations for generating fine print for a promotion from the perspective of a sales representative or merchant, in accordance with some example embodiments;

FIG. 10 illustrates a flowchart describing example operations for dynamically updating fine print clause data structures, in accordance with some example embodiments;

FIG. 11 illustrates a flowchart describing additional example operations for dynamically updating fine print clause data structures, in accordance with some example embodiments; and FIG. 12 illustrates a flowchart describing example operations for generating a set of fine print clause data structures, in accordance with some example embodiments.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and is operable to provide example promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "merchant" may include, but is not limited to, a business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. One example merchant may be a running company that sells attire for use by a person who runs or participates in athletic activities.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. Using the running company promotion as an example, the accepted value is $25 and the promotional value is $50. In this example, the residual value may be equal to the accepted value.

As used herein, the term "fine print" may include parameters (legal or contractual), bounds, considerations and/or the like that outline the term, timing, constraints, limitations, redemption parameters, rules or the like for how and/or when a promotion may be redeemed, and which may also include limitations on liability, conditions for eligibility, warnings, or any other notification that a merchant may desire to place on a promotion. For example, an indication that the promotion must be redeemed prior to a specified deadline, for a specific good, service or experience and/or the like. For example, using the aforementioned running company as the example provider, examples of fine print may be: a limit of one purchase per person; limiting redemption to only physical store locations; or an expiration date of May 29, 2013.

Overview

A method, apparatus, and computer program product are provided in accordance with an example embodiment of the present invention in order to improve the generation of fine print for promotions.

When providing promotions to a large number of consumers across the world, a promotion and marketing service must become increasingly sensitive to the variety of types, detail, and content of fine print included in its promotions. Moreover, when offering promotions for a wide variety of merchants, it becomes increasingly important to ensure flexibility regarding the types of fine print that may be included in any given promotion. Historically, individual sales representatives have worked with merchants to manually develop and prepare, fine print for promotions. However, there are several drawbacks of this manual method for generating fine print in documents.

For instance, human error can always cause problems. Even the most attentive sales representative will occasionally make inadvertent typographical or grammatical errors, which can make the fine print unclear. Moreover, such errors present a monetary risk, such as when the fine print accidentally authorizes windfall redemptions for customers.

Similarly, when a sales representative manually develops fine print for a promotion based on an interaction with a merchant, there exists a chance that some part of the merchant's intent during the interaction will get lost, and will therefore not be captured by the fine print that the sales representative eventually develops.

Moreover, even if the merchant's intent is captured, by developing fine print manually, the fine print that eventually is drafted may often be worded differently from the language desired by the merchant, and small changes in language may have large effects on the rights of the parties governed by the promotion.

As a result of these problems and others that may arise from time to time, consumers who purchase promotions may be driven to seek refunds for purchased promotions, rather than redeeming the promotions for products and services at merchant locations. Not only do refund requests tarnish the brand of both the merchant and promotion and marketing service and reduce profits, but refund requests can reduce the value of the promotion to merchants, thereby driving some amount of business away from the promotion and marketing service.

Accordingly, to surmount these problems, example embodiments of the present invention are shown for generating fine print that is more robust, efficiently created, and better captures merchant intent. In some example embodiments, a set of fine print clause data structures is developed encapsulating the universe of potential fine print clauses that may be used in a typical promotion. Moreover, the fine print clause data structures are associated with locations and products or services within which they are expected to be used. Accordingly, a sales representative or a merchant, when interacting with the promotional system, may create fine print for a promotion by using an intuitive user interface to select and configure relevant fine print clauses. By standardizing the fine print clauses that may be selected, the promotion and marketing service may improve the consistency of its fine print, improve the user experience of merchants due to the speed with which the fine print can be created, and accordingly increase the value of the promotion itself.

Example embodiments of the present invention enhance the merchant experience by enabling self-service creation of promotion fine print; thereby reducing the degree of reliance upon sales representatives that otherwise may exist. In addition, due to the configurability of the fine print clause data structures described below, example embodiments of the present invention provide a way to maintain the flexibility and modifiability of traditional methods for manually generating promotion fine print.

System Architecture

The method, apparatus, and computer program product of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, an example embodiment may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Sales representatives and merchants may access a promotional system 102 via a network 112 (such as the Internet, or the like) using computer devices 114A through 114N and 116A through 116N, respectively. Moreover, the promotional system 102 may comprise a promotional server 104 in communication with a promotional database 106. The promotional system may further have access to a clause database 108 that stores fine print clause data structures and mapping data structures, and a historical database 110 storing historical information regarding previously offered promotions. The promotional system 102 is, in some examples, able to generate, deploy, and/or update fine print clause data structures, as will be described below.

The promotional server 104 may be embodied by a computing system, such as apparatus 200 shown in FIG. 2. As illustrated in FIG. 2, the apparatus 200 may include a processor 202, a memory 204, an input/output module 206, a communications module 208, a clause rating module 210, and a clause editing module 212, and may be configured to execute the operations described below. In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 202 may be embodied in a number of different ways and may, for example include one or more processing devices configured to perform independently. Additionally or alternatively, the processor may include one or more processors configured in tandem via a bus to enable independent execution of instructions, pipelining, and/or multithreading.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include an input/output module 206 that may, in turn, be in communication with processor 202 to provide output to the user and, in some embodiments, to receive an indication of a user input. The input/output module may comprise a user interface and may include a display and may comprise a web user interface, a mobile application, a client device, a kiosk, or the like. In some embodiments, the input/output module 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

Meanwhile, the communications module 208 may be any means such as a device or circuitry embodied in either hardware or a combination of hardware and software that is configured to receive and/or transmit data from/to a network and/or any other device or module in communication with the apparatus 300. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

The clause rating module 210 may be used to calculate ratings for fine print clause data structures, as well be described in greater detail below. The ratings may comprise an estimate of the impact of the fine print clause data structure on the performance of a promotion in which the fine print is included. The ratings may be based on an analysis of previously offered promotions, stored in historical database 110 and/or promotional database 106. Moreover, upon expiration of a promotion, the clause rating module may update ratings for the fine print clause data structures used in the promotion, taking into account the additional data gathered from the expired promotion. As a result, the clause rating module 210 is able to dynamically update the fine print clause data structures and mapping data structures in a way that ensures that the most accurate and relevant fine print is suggested to sales representatives, merchants, or other promotion creator in view of the latest performance metrics.

The clause editing module 212 may be used to create and revise fine print clause data structures, as well as mapping data structures, used in embodiments of the present invention. The clause editing module 212 may generate new fine print clause data structures by evaluating previously offered promotions and identifying fine print clauses that may be relevant to future promotions. The clause editing module 212 may also revise existing fine print clause data structures in view of revised clause ratings determined by the clause rating module 210. Finally, the clause editing module 212 may create and revise mapping data structures, which document relationships between products, services, and locations at which promotions may be redeemed.

In one embodiment, a sales representative or merchant may use the apparatus 200 to generate promotion fine print in accordance with example embodiments of the invention. However, other embodiments of the present invention may run outside of the promotional system 102, such as, for example, on an end-user device, such as sales representative device 114 or merchant device 116.

Referring now to FIG. 3, a block diagram is illustrated showing an example apparatus 300 that may be configured to enable a user to generate fine print from outside the promotional system 102, in accordance with embodiments of the present invention.

In FIG. 3, the apparatus 300, which may embody sales representative device 114 or merchant device 116, may include or otherwise be in communication with a processor 302, a memory 304, a communications module 308, and a user interface 306. In some embodiments, the processor (and/or co-processor or any other processing circuitry assisting or otherwise associated with the processor) may be in communication with the memory 304 via a bus for passing information among components of the apparatus. The memory 304 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 302 may be embodied in a number of different ways and may, for example include one or more processing devices configured to perform independently. Additionally or alternatively, the processor may include one or more processors configured in tandem via a bus to enable independent execution of instructions, pipelining, and/or multithreading.

In an example embodiment, the processor 302 may be configured to execute instructions stored in the memory 304 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 300 may include a user interface 306 that may, in turn, be in communication with processor 302 to provide output to the user and, in some embodiments, to receive an indication of a user input. As such, the user interface may include a display and may comprise a web user interface, a mobile application, a client device, a kiosk, or the like. In some embodiments, the user interface 306 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

Meanwhile, the communications module 308 may be any means such as a device or circuitry embodied in either hardware or a combination of hardware and software that is configured to receive and/or transmit data from/to a network and/or any other device or module in communication with the apparatus 300. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

Data Structures

To enable a user (such as a sales representative, a merchant, or any other entity interacting with the promotion system) to select and configure fine print, embodiments of the present invention involve the use of fine print clause data structures stored in clause database 108. In some embodiments, the fine print may be generated for use with a promotion, although in other embodiments, the fine print may be intended for other potential applications, such as purchase agreements, employment agreements, barter systems, general contractual arrangements, or any other implementation in which fine print may have a meaningful implication on the various rights and duties of the parties. Each fine print clause data structure includes a field holding its associated fine print clause, as well as additional fields for other information relating to the clauses, as show in FIG. 4a.

FIG. 4a illustrates an example block diagram representing various elements that may be included in the fine print clause data structure. In this regard, each such data structure includes a name, representing a key by which the fine print clause data structure may be queried and/or easily associated, using a mapping data structure (described below) with other data stored in clause database 108. In addition, the fine print clause data structure includes a text field storing the fine print clause itself. As will be described in greater detail below, some or all of the text in the text field may be configurable. In addition to the fine print clause text field, however, the fine print clause data structure further includes another text field that stores help text, which describes the meaning of the fine print clause (which may not itself be intuitive when read out of context).

Finally, the data structure includes three default fields: a "Show-By-Default" field, a "Select-By-Default" field, and a "Required-By-Default" field. The default fields indicate default rules for configuring the fine print for a given promotion in the absence of the receipt of specific contrary rules from a mapping data structure, as will be described in greater detail below. If the "Show-By-Default" field is true, then the fine print clause stored in the data structure will be shown to the user via the user interface 306 for the user's selection. If the "Select-By-Default" field is true, then the fine print clause stored in the data structure will be shown to the user for selection, but will also be automatically selected, and therefore will be included in the fine print for the promotion unless the user specifically deselects the fine print clause. If the "Required-By-Default" field is true, then the fine print clause stored in the data structure will be shown to the user, selected for inclusion in the fine print for the promotion, and will not be de-selectable.

Optionally, the fine print clause data structure may also include a numerical rating field that indicates an estimated impact of the fine print clause on the performance of a promotion in which it is included, as calculated by the clause rating module 210. As will be described in greater detail below, the prominence of the fine print clause as it is presented to the user may be set and/or adjusted based on the value of the rating field.

Turning now to FIG. 4b, a representation of a mapping data structure is illustrated that can be used to identify relevant fine print clause data structures for presentation to a sales representative or merchant. As with the fine print clause data structure, the mapping data structure includes a name field. Furthermore, the mapping data structure includes a products/services field, which includes every product and/or service to which the mapping is associated. The mapping data structure further includes a clauses field, which lists all of the fine print clause data structures 402A to 402N that are allowable for the combination of products/services and locations in the mapping. For each such fine print clause data structure 402, the mapping additionally includes fields "Show," "Selected," and "Required" that, if non-empty, comprise rules that override the default values stored in the respective default fields of the fine print clause data structure. Finally, the mapping data structure includes a location field, which specifies the location(s) at which a given required/selected/shown field applies for a given clause. In one embodiment, a mapping for a specific location overrides a mapping for a more general location. For example: Mapping 1 specifies that Clause A for Service 1 is required in all locations. Mapping 2 specifies that Clause A for Service 1 is available (but not required) in Illinois. Outside of Illinois, Mapping 1 would be the rule. Inside Illinois, Mapping 2 would take precedence.

Accordingly, the promotional system 102 may use the mapping data structure to quickly identify potential fine print clauses for use in a potential promotion based on the product or service to be offered and the possible locations where the merchant may accept redemptions. Moreover, the promotional system 102 may use the fine print clause data structure to store information relevant to the potential configurations of the fine print clauses.

Turning now to FIG. 4c, a representation of an example configurable text data structure is illustrated. Each configurable text data structure may be referenced from within the text field of a corresponding fine print clause data structure, and is used to enable configuration of a standardized fine print clause by the user via a user interface (e.g., user interface 306, or the like). Each configurable text data structure includes a name, in similar fashion as both the fine print clause data structure and the mapping data structure. In addition, each configurable text data structure includes a type, which indicates a manner with which the remaining data in the configurable text data structure should be displayed (either as a text box or a dropdown menu), as illustrated in FIG. 4c.

If a configurable text type is a text box, the configurable text data structure includes both default text (text that will appear upon initial display of the associated fine print clause to a sales representative or merchant) and a regular expression (regex) validation field, which controls the manner with which the configurable text may be modified. For example, in an example in which the fine print clause recites "Limit <property name='purchase_limit_per_person'>1</>per person," the default text is "1" and the regex validation field recites "any whole number >=1." Accordingly, the default text can be replaced with any whole number greater than one without violating the regex validation field.

The configurable text type may alternatively comprise a dropdown menu. In this case, the configurable text data structure includes a series of values 404A to 404N, as well as a default value. Each value 404 includes fields storing dropdown text that will be shown within the dropdown menu, and fine print text that will populate the fine print clause if the corresponding dropdown text is selected from the dropdown menu.

Using configurable text data structures within fine print clause data structure, the promotional system is able to transmit to a user a series of configurable fine print clauses, while still enforcing rules upon the nature of the configurations allowed. As a result, the flexibility of the manual fine print generation process is maintained, while also introducing standardization of possible fine print clauses.

Promotional System Operations

Turning now to FIG. 5, example operations for generating fine print for a promotion are illustrated from the perspective of a promotion and marketing service. The operations illustrated in FIG. 5 may, for example, be performed by the promotional system 102 (e.g., promotional server 104), with the assistance of, and/or under the control of one or more devices, such as apparatus 200, and may use processor 202, memory 204, input/output module 206, and communications module 208.

In operation 502, the apparatus 200 includes means, such as input/output module 206, communications module 208, or the like, for receiving information identifying a location at which a customer may redeem a promotion and either a product or a service associated with the promotion. This information is likely received from a sales representative device 114 or a merchant device 116 and via a network 112, as illustrated in FIG. 1. However, in some embodiments, this information may be received by direct user input using input/output module 206.

In operation 504, the apparatus 200 includes means, such as processor 202 or the like, for identifying, based on the received information (e.g. information about the promotion such as the service or good offered, the location of the merchant offering the promotion, the category or sub-category of the promotion within a service taxonomy, a price or the like), relevant fine print clause data structures. For example, for a food and drink meal at a five star restaurant location, a relevant fine print clause data structure may include a clause regarding suitable attire, which may not be relevant for a promotion regarding a baseball game. Similarly, a fine print clause data structure may be relevant for a promotion for skydiving, while not relevant for a promotion for a discount on ice cream. In other examples, a promotion related to a nightclub may have an age restriction, where a travel promotion may include blackout dates. The identification process is described in greater detail below with respect to FIG. 6.

In one embodiment, at least one fine print clause data structure includes configurable text, such as by referencing a configurable text data structure described above with respect to FIG. 4c. In another embodiment, each identified fine print clause data structure includes fields indicating default instructions regarding whether an associated fine print clause is required for the promotion, selected for inclusion in the promotion, or should be shown to a user for selection. In yet another embodiment, each fine print clause data structure includes a rating indicating an impact upon promotion performance. In this regard, the rating may be calculated based on historical performance of previously offered promotions, as described below with respect to FIGS. 10 and 11.

Turning now to FIG. 6, example operations are shown for identifying relevant fine print clause data structures. As with the FIG. 5, the operations illustrated in FIG. 6 may, for example, be performed by the promotional system 102 (e.g., promotional server 104), with the assistance of, and/or under the control of one or more devices, such as apparatus 200, and may use processor 202, memory 204, input/output module 206, and communications module 208.

In operation 602, the apparatus 200 includes means, such as processor 202, memory 204, clause database 108, or the like, for searching for mapping data structures associated with the location and either the product or service received above in operation 502. In this regard, mapping data structures are normally stored in clause database 108, and therefore may be accessed from promotional system 102. In operation 604, the apparatus 200 includes means, such as memory 204, input/output module 206, or clause database 108, for receiving search results comprising one or more mapping data structures.

Subsequently, in operation 606, the apparatus 200 includes means, such as input/output module 206, communications module 208, or the like, for retrieving fine print clause data structures listed in the one or more mapping data structures. In this regard, as described above with respect to FIG. 4b, each mapping data structure includes a list of associated fine print clause data structures that may be readily identified by querying the respective fields of the mapping data structures. In some embodiments, this operation further includes retrieving from the one or more mapping data structures, for each fine print clause data structure, presentation information indicating whether the fine print clause associated with the fine print clause data structure is required for the promotion, selected for inclusion in the promotion, or should be shown to a user for selection, wherein transmitting the relevant fine print clause data structures to the user device includes transmitting the presentation information for each fine print clause data structure.

In operation 608, the apparatus 200 includes means, such as processor 202, or the like, for identifying the retrieved fine print clause data structures.

Returning to FIG. 5, in operation 506, the apparatus 200 includes means, such as input/output module 206, communications module 208, or the like, for transmitting information including the relevant fine print clause data structures identified in operation 504. Accordingly, in embodiments in which presentation information is retrieved in operation 606, the information transmitted may include the presentation information. Although in many embodiments information is transmitted to the device from which information is received in operation 602, return transmission is not a necessity, and the identified relevant fine print clause data structures may be transmitted to another device (e.g., if the information is received from a merchant terminal 116, the fine print clause information may be transmitted to a sales representative terminal 114, or vice versa).

In operation 508, the apparatus 200 includes means, such as input/output module 206, communications module 208, or the like, for receiving a configured fine print data structure for the promotion based on the transmitted relevant fine print clause data structures. In this regard, the creation of the configured fine print data structure is discussed below with respect to FIGS. 7, 8, and 9.

Finally, in operation 510, the apparatus 200 may optionally include means, such as processor 202, or the like, for generating a promotion including a fine print string based on the configured fine print data structure. In this regard, creating the fine print string includes generating a string including the language from each of the selected fine print clauses and any redemption information contained in the configured fine print data structure. In one embodiment, each fine print clause includes a mapping to a string in each of a variety of languages, so that the generated promotion may include fine print in a relevant language (e.g., a promotion redeemable in Spain may thus include Spanish fine print).

Accordingly, using the possible redemption locations and the product or service associated with the potential promotion, the promotional system 102 is able to identify relevant fine print clauses, transmit them for presentation to a user, and generate a promotion based on subsequently configured fine print.

User Interface Operations

In addition, as described herein, embodiments of the present invention are able to receive relevant fine print clauses and configure a fine print data structure for use in a promotion. Turning now to FIG. 7, an example user interface 700 is shown, with which a sales representative or merchant may interact. Embodiments of the present invention may be implemented using user interface 700, which may in one example embodiment comprise a web user interface. In this regard, the user interface 700 may comprise a graphical user interface that enables a user, another computing device connected to the interface 700, or the like, to generate and update fine print for a promotion.

As shown in FIG. 7, user interface 700 may display fine print clauses for selection. In this regard, the user interface 700 may separate the displayed fine print clauses according to their relevance. For instance, required fine print 702 (identified using either default rules retrieved from corresponding fields of the fine print clause data structure, or using rules retrieved in a mapping data structure and received from the promotional system 102, as described above) may be presented first, followed by recommended fine print 706 (fine print that, by rule, is shown and may also be preselected for inclusion in the fine print string), followed by a button 708, corresponding to all relevant fine print that is not shown by rule to the user, but which may become visible after selection of button 708. User interface 700 further shows configurable text 704 (in this case a text box, but which, as described previously, may alternatively be a dropdown menu). Moreover, user interface 700 includes a "Redemption Instructions" field 710, into which a sales representative or merchant may insert ad hoc additional fine print that might not be presented to the user initially. The redemption instructions field 710 ensures flexibility of the fine print generation process, as the sales representative/merchant retains the option to manually enter any additional fine print clauses that are not already displayed by the user interface. Finally, the interface 700 also displays the currently selected redemption locations 712, and a button 714 enabling a user to designate a new location at which redemption will be allowed.

Alternatively or additionally, in some examples, a user interface may include one or more drop down boxes or other types of list boxes that contain fine print clauses that relate to certain messages that would be included in the fine print of the promotion. For example, in an Italian restaurant promotion, a first box may contain a listing of quantity clauses (e.g., limit one per person; limit one per person, may buy one as a gift, etc.) and a second box containing a list of dining option clauses (e.g., dine in, take out or dine in/take out). Other display methods may be used in other example embodiments.

FIG. 8 illustrates a flowchart containing example operations for generating a fine print data structure from the perspective of a user interface with which a sales representative or merchant interacts. The operations illustrated in FIG. 8 may, for example, be performed by the sales representative device 114 or merchant device 116, with the assistance of, and/or under the control of one or more devices, such as apparatus 300, and may use processor 302, memory 304, user interface 306, and communications module 308.

In operation 802, apparatus 300 includes means, such as user interface 302, communications module 308, or the like, for receiving identifying information that identifies one or more locations at which a customer may redeem a promotion and either a product or a service associated with the promotion. In this regard, the identifying information may be entered by the sales representative or merchant using user interface 302, or may be extracted from a promotional system 102 (such as, for example, from promotional database 106, which may contain merchant information such as products/services offered and/or locations available for redemption).

In operation 804, apparatus 300 includes means, such as user interface 302, communications module 308, or the like, for transmitting the identifying information. In this regard, the identifying information may be transmitted to the promotional system 102, which identifies fine print clause data structures relevant to the identifying information.

Subsequently, in operation 806, apparatus 300 includes means, such as user interface 302, communications module 308, or the like, for receiving, based on the identifying information, information including a set of relevant fine print clause data structures. In some embodiments, this information also may include information, originally retrieved from a mapping data structure, indicating whether a fine print clause associated with the fine print clause data structure is required for the promotion, selected for inclusion in the promotion, or should be shown to a user for selection.

In operation 808, the apparatus 300 may include means, such as user interface 306, or the like, for displaying one or more fine print clauses from the relevant fine print clause data structures. In one embodiment, the one or more fine print clauses may be displayed based on either the default rules or rules received from a mapping data structure. In this regard, based on these rules, displaying the one or more fine print clauses may first include determining from the received information, for each fine print clause data structure, whether an associated fine print clause is required for the promotion, selected for inclusion in the promotion, or should be shown for selection by a user. As a result, the one or more fine print clauses that may be displayed may comprise the fine print clauses that are required for the promotion, selected for inclusion in the promotion, or that should be shown to a user for selection.

In some embodiments, displaying the one or more fine print clauses may further include determining, from the relevant fine print clause data structures, a rating of each of the fine print clauses. The rating may, as described previously, be stored as a field within each fine print clause data structure, and therefore may easily be retrieved. Based on the rating, the apparatus 300 may include means, such as the user interface 306, or the like, for adjusting the prominence of the fine print clauses displayed. In one such embodiment, adjusting the prominence may include listing some fine print clauses higher on the page than others. In another such embodiment, font and/or text sizes may be manipulated to increase or decrease the prominence of fine print clauses based on the rating. In yet another embodiment, if a fine print clause has a particularly higher or low rating, the fine print clause may be reclassified as a required clause or a non-recommended clause.

Additionally or alternatively, the rating may be indicative of the success (in monetary terms, by user traffic, by advertising penetrations, or by any other desired metric) that the fine print clause imparts on a promotion when associated with a particular mapping of a product or service with one or more locations. As a result, in some embodiments, displaying the one or more fine print clauses may include displaying a numerical or graphical indication of the rating of each fine print clause in association with the displayed fine print clause. Moreover, in some such embodiments, the apparatus 300 may update the rating display based on the effect that inserted configurable text may have on the rating of a fine print clause. For instance, in the previously recited example in which the fine print clause recites "Limit <property name='purchase_limit_per_person'>1</>per person,"

the default text is "1" and the calculated rating may indicate that inclusion of the fine print clause can be estimated to increase profit by 5% (the first unit sells at a discount, but prompts repeat purchases that otherwise would not have occurred). However, if the configurable text is configured such that the clause recites "Limit 5 per person," the rating of the fine print clause may be updated based on data in the historical database 110 to reflect that the impact of the fine print clause is estimated to decrease profit by 15% (although total sales may rise, data in the historical database 110 may suggest that this higher limit per person would eliminate the potential for full-price repeat visits while also causing some potential full price purchasers to instead purchase at the discount price). As such, and in some examples, based on data related to the promotion fine print may be suggested by the system based on the fine print maximizing a margin value when compared to other fine print combinations.

In a further extension of this embodiment, the display may further identify a reason for the change in the rating based on the change in the configurable text. For example, in an example where the promotion is $5 for $15 worth of pizza, one fine print clause may recite "Eligible for <property name='patron_type'>take out</>customers only." The historical database 110 may suggest that people do not dine in the identified locations, and accordingly, if the configurable fine print were modified such that the fine print stated "Eligible for dine in customers only," the rating of the fine print clause may drop in substantially real-time.

In some embodiments, in response to presenting a display by the user interface, additional information may be received, such as, for example, an additional location (received after selection by the sales representative or merchant of button 714, described previously). Accordingly, based upon the input received by the user interface, the apparatus 300 may optionally return to operation 802.

Thereafter, in operation 810 the apparatus 300 may include means, such as user interface 302, communications interface 306, or the like, for generating a configured fine print data structure for the promotion based on the displayed fine print clauses and user input, which is described in greater detail in connection with FIG. 9.

Turning now to FIG. 9, a flowchart is illustrated containing example operations for generating a configured fine print data structure. The operations illustrated in FIG. 9 may, for example, be performed by the sales representative device 114 or merchant device 116, with the assistance of, and/or under the control of one or more devices, such as apparatus 300, and may use processor 302, memory 304, user interface 306, and communications module 308.

In operation 902, apparatus 300 includes means, such as user interface 302, communications module 308, or the like, for receiving input indicating selection of one or more of the displayed fine print clauses.

In operation 904, apparatus 300 may optionally include means, such as user interface 302, communications module 308, or the like, for receiving input configuring any configurable portions of the selected fine print clauses. As described previously, the configurable portions may be configured via text box input (in which case only certain text entries will be accepted) or a dropdown menu which necessarily has only a limited number of selections.

In operation 906, apparatus 300 may optionally include means, such as user interface 302, communications module 308, or the like, for receiving redemption instructions. As described previously with respect to FIG. 7, the user interface 700 may allow the sales representative or merchant to enter additional fine print clauses for inclusion in the fine print string.

Finally, in operation 908, apparatus 300 includes means, such as processor 302, or the like, for creating a configured fine print data structure including the selected fine print clauses and any received redemption information.

Returning now to FIG. 8, in operation 812, apparatus 300 includes means, such as user interface 302, communications module 308, or the like, for transmitting the configured fine print data structure to the promotional system 102, which may then generate a promotion using the fine print data structure.

Dynamic Updating

Embodiments of the present invention described above illustrate some example ways in which the fine print builder is able to improve the generation of fine print for promotions. However, understanding the impact that fine print may have on the ultimate success or failure of a promotion may further streamline process by which a promotion and marketing service may wish to present fine print clauses to its sales representatives and/or merchants.

Accordingly, FIG. 10 illustrates a flowchart containing example operations for dynamically updating fine print clause data structures. The operations illustrated in FIG. 10 may, for example, be performed by the promotional system 102 (e.g., promotional server 104), with the assistance of, and/or under the control of one or more devices, such as apparatus 200, and may use processor 202, memory 204, input/output module 206, and communications module 208.

In operation 1002, apparatus 200 includes means, such as processor 202 or the like, for identifying a fine print clause data structure. In this regard, the operations described in FIG. 10 may be performed for every fine print clause data structure stored in clause database 108 periodically, or may be performed for recently used fine print clause data structures, or may be performed for random fine print clause data structures at periodic intervals.

In operation 1004, the apparatus 200 may include means, such as input/output module 206, communications module 208, clause rating module 210, historical database 110, or the like, for receiving data regarding historical performance of previously offered promotions that have included the same or a similar fine print clause data structure. This performance information may include the number of promotions offered, the number of promotions purchased, and the number of promotions redeemed, as well as the relevant timeframes for each of these events.

Subsequently, in operation 1006, the apparatus 200 may include means, such as such as processor 202, clause rating module 210, or the like, for rating a performance impact of the fine print clause data structure based on the received data. In this regard, rating performance impact is discussed in greater detail with respect to FIG. 11, which illustrates a flowchart containing example operations for dynamically updating fine print clause data structures.

The operations illustrated in FIG. 11 may, for example, be performed by the promotional system 102 (e.g., promotional server 104), with the assistance of, and/or under the control of one or more devices, such as apparatus 200, and may use processor 202, memory 204, input/output module 206, and communications module 208.

In operation 1102, apparatus 200 includes means, such as processor 202, or the like, for determining the previously offered promotions that include the fine print clause data structure. This process may comprise querying the historical database 110 to retrieve a historical set of previously offered promotions, searching the associated fine print for certain phrases from the fine print clause data structure, and flagging each historical promotion as containing or not containing the phrases included in the fine print clause data structure. The apparatus 200 can thus map each phrase or combination of phrases to a fine print clause and to previously offered promotions.

In operation 1104, the apparatus 200 may include means, such as processor 202, clause rating module 210, or the like, for evaluating success of the previously offered promotions that include the fine print clause data structure. This performance information may include, as previously noted, the number of promotions offered, the number of promotions purchased, and the number of promotions redeemed, as well as the relevant timeframes for each of these events. Moreover, the performance indication may further include the promotions' return on investment, rate of sales, total revenue, upsell amount, additional spending prompted by the promotion, and/or any other factor that may indicate relative success or failure of a promotion.

Subsequently, in operation 1106, the apparatus 200 may include means, such as such as processor 202, clause rating module 210, or the like, for calculating a significance of the fine print clause data structure to the evaluated success. In this regard, as the sample size of historical promotions grow, the apparatus 200 will be increasingly able to control for variables other than individual fine print clauses, and may thus be able to determine the causal relationship between individual fine print clause data structures and performance of promotions. In this regard, the apparatus 200 may apply a multivariable linear regression model, including the fine print clauses and other deal parameters (location, merchant quality, etc.), to determine the impact of a given fine print clause on deal performance.

In operation 1108, the apparatus 200 may include means, such as processor 202, memory 204, clause editing module 212, clause database 108, or the like, for updating the fine print clause data structure to include a rating based on the calculated significance.

Returning now to FIG. 10, in operation 1008, the apparatus 200 may include means, such as processor 202, memory 204, clause editing module 212, clause database 108, or the like, for storing the rating in the fine print clause data structure. In some embodiments, the apparatus 200 may update mapping data structures based on the ratings of the fine print clause data structures.

Accordingly, by evaluating the impact of fine print clauses on promotion performance, the fine print clause data structures and mapping data structures may be optimized automatically to maximize the utility of offering promotions for both merchants and for the promotion and marketing service.

Fine Print Clause Generation

As described above, embodiments of the present invention automate the process of generating fine print for promotions based on standardized fine print clauses. In some embodiments, the standardized fine print clauses are created using the institutional knowledge of employees of the promotion and marketing service. However, in other embodiments, the standardized fine print clauses are derived from promotions that have been previously offered by the promotion and marketing service. In this way, fine print clause generation can also be automated, which may further reduce error and increase the breadth of clauses available for use with the above-described embodiments.

Accordingly, FIG. 12 illustrates a flowchart containing example operations for generating a set of fine print clause data structures. The operations illustrated in FIG. 12 may, for example, be performed by the promotional system 102 (e.g., promotional server 104), with the assistance of, and/or under the control of one or more devices, such as apparatus 200, and may use processor 202, memory 204, input/output module 206, and communications module 208.

In operation 1202, apparatus 200 includes means, such as processor 202, or the like, for identifying free-text fine print clauses from a set of previously offered promotions. These promotions may be received, for example, from historical database 110 or promotional database 106. In this regard, sales representatives may be provided with the flexibility to enter free-text clauses above and beyond those clauses currently associated with fine print data structures. By searching through a set of previously offered promotions, the apparatus 200 is able to identify clauses using which to create potential new fine print data structures.

In operation 1204, the apparatus 200 may include means, such as processor 202, clause editing module 212, or the like, for extracting free-text fine print clauses from the set of previously offered promotions. In this regard, the previously offered promotions may be parsed into constituent elements, which are then analysed by the apparatus 200 to identify individual grammatical phrases which comprise fine print clauses. In some examples, the identified grammatical phrases may be assigned to a type of a clause (e.g., a quantity clause, an expiration clause or the like) and each clause may be assigned to a particular good or service type.

Subsequently, in operation 1206, the apparatus 200 may include means, such as such as processor 202, clause editing module 212, or the like, identifying common free-text clauses not available in fine print data structures. In this regard, the free-text entries may be analyzed for patterns of text that arise, frequent words, etc. Based on this identification, common clauses that are not currently available in a fine print data structure can be identified.

In operation 1208, the apparatus 200 may include means, such as processor 202, clause editing module 212, or the like, for creating fine print clause data structures for each common free-text fine print clause. In this regard, the most common phrasing is used as the phrasing of the fine print clause included in each fine print clause data structure. Moreover, in some example embodiments, the fine print clause data structures may be built based on the fine print clause data structures being causally related to increased revenue when compared to other fine print clause data structures. In yet other example embodiments, the apparatus 200 may continue to monitor whether creation of the new fine print data structures reduces the instances of each common pattern in the free-text entries.

Optionally, in operation 1210 the apparatus 200 may include means, such as processor 202, clause editing module 212, or the like, for associating each new fine print clause data structure with the locations and the product or service of the promotions that include the free-text fine print clause data structure. In this regard, when adding the clause, the apparatus 200 may determine the mappings based on the free text instances (e.g., if the free-text fine print clauses are found in promotions pooled largely in one geography, or only in big cities, then the newly created fine print clause data structure will be available in those locations). As noted previously, this association may comprise creating a mapping data structure that can be queried to identify the newly created fine print clause data structures.

Finally, in operation 1212, the apparatus 200 may optionally also include means, such as processor 202, memory 204, clause editing module 212, or the like, for updating fields of the fine print clause data structures to indicate default instructions. As discussed previously and shown in FIG. 4*a*, each created clause data structure includes fields with default options for how the fine print clause should be presented to the user if the mapping data structure fails to include specific instructions.

Accordingly, although the fine print clauses may be manually designed, and the fine print clause data structures may be manually created based thereon, as shown herein, some embodiments may automatically generate the fine print clauses and fine print clause data structures based on previously offered promotions.

As will be appreciated, computer program code and/or other instructions may be loaded onto a computer, processor or other programmable apparatus's circuitry to produce a machine, such that execution of the code on the machine by the computer, processor, or other circuitry creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for machine learning to programmatically select and transmit relevant fine print clause data structures to a user device to facilitate user definition of configured fine print data structures for a promotion that is offered by a promotion and marketing service, the method comprising:
   receiving, from the user device, information identifying one or more locations at which a customer may redeem the promotion and either a product or a service for which the promotion may be redeemed;
   automatically identifying and dynamically generating, based on the received information, the relevant fine print clause data structures stored in a memory, wherein fine print clause data comprises legal and contractual parameters that outline a term, timing, and constraints for how and when a promotion may be redeemed, the term, timing, and constraints for how and when a promotion may be redeemed comprising and further comprise limitations on liability, conditions for eligibility, and warnings that a merchant places on a promotion, and further comprises an indication that the promotion must be redeemed prior to a specified deadline, for a specific good, service or experience,
   wherein the automatically identifying and dynamically generating of the relevant fine print clause data structures comprises:
     searching the memory for one or more mapping data structures associated with the location and either the product or the service;
     receiving search results comprising the one or more mapping data structures;
     retrieving the fine print clause data structures listed in the one or more mapping data structures;
     determining a causal relationship between the retrieved fine print clause data structures and performance of promotions to which the retrieved fine print clause data structure have been applied to determine an impact of a given fine print clause on promotion performance,
     wherein the determining of the impact of the given fine print clause on promotion performance comprises:

querying a historical database to retrieve a historical set of previously offered promotions, searching the associated fine print for certain phrases from the fine print clause data structure, and flagging each historical promotion as containing or not containing the phrases included in the fine print clause data structure; and applying a multivariable linear regression model, including the fine print clauses and other deal parameters including at least a location and a merchant quality, to determine the impact of a given fine print clause on deal performance;

selecting the relevant fine print clause data structures based on the determined impacts; and assigning, based on the determined impact of the given fine print clause on promotion performance, each of the selected relevant fine print clause data structures one of three default fields, including: a "Show-By-Default" field, a "Select-By-Default" field, and a "Required-By-Default" field, wherein the default fields indicate default rules for configuring the relevant fine print clause data structures for a given promotion, wherein if the "Show-By-Default" field is true, then the fine print clause stored in the data structure will be shown to the user via the user interface for the user's selection, if the "Select-By-Default" field is true, then the fine print clause stored in the data structure will be shown to the user for selection, but will also be automatically selected, and therefore will be included in the fine print for the promotion unless the user specifically deselects the fine print clause, and if the "Required-By-Default" field is true, then the fine print clause stored in the data structure will be shown to the user, selected for inclusion in the fine print for the promotion, and will not be de-selectable;

transmitting the relevant fine print clause data structures to the user device, configured for display in accordance with a respective impact of the given fine print clause on promotion performance;

receiving, from the user device, the configured fine print data structure for the promotion based on the transmitted relevant fine print clause data structures, wherein the promotion is generated for display by the promotion and marketing service; and generating, by the processor, in real-time, a promotion including a fine print string based on the configured fine print data structure.

2. The method of claim 1, further comprising:

retrieving from the one or more mapping data structures, for each fine print clause data structure, presentation information indicating whether a fine print clause associated with the fine print clause data structure is required for the promotion, selected for inclusion in the promotion, or should be shown to a user for selection, wherein transmitting the relevant fine print clause data structures to the user device includes transmitting the presentation information for each fine print clause data structure.

3. The method of claim 1, wherein at least one fine print clause data structure includes configurable text.

4. The method of claim 1, wherein each fine print clause data structure includes fields indicating default instructions regarding whether an associated fine print clause is required for the promotion, selected for inclusion in the promotion, or should be shown to a user for selection.

5. An apparatus for machine learning to programmatically select and transmit relevant fine print clause data structures to a user device to facilitate user definition of configured fine print data structures for a promotion, the apparatus comprising a processor and a non-transitory memory, the memory storing computer program code that, when executed by the processor, causes the apparatus to:

receive, from the user device, information identifying one or more locations at which a customer may redeem the promotion and either a product or a service for which the promotion may be redeemed;

automatically identify and dynamically generate, based on the received information, the relevant fine print clause data structures stored in a memory, wherein the automatic identification and dynamic generation of the relevant fine print clause data structures comprises:

searching the memory for one or more mapping data structures associated with the location and either the product or the service;

receiving search results comprising the one or more mapping data structures;

retrieving the fine print clause data structures listed in the one or more mapping data structures;

determining a causal relationship between the retrieved fine print clause data structures and performance of promotions to which the retrieved fine print clause data structure have been applied to determine an impact of a given fine print clause on promotion performance, wherein the determining of the impact of the given fine print clause on promotion performance comprises:

querying a historical database to retrieve a historical set of previously offered promotions, searching the associated fine print for certain phrases from the fine print clause data structure, and flagging each historical promotion as containing or not containing the phrases included in the fine print clause data structure; and applying a multivariable linear regression model, including the fine print clauses and other deal parameters including at least a location and a merchant quality, to determine the impact of a given fine print clause on deal performance;

selecting the relevant fine print clause data structures based on the determined impacts; and assigning, based on the determined impact of the given fine print clause on promotion performance, each of the selected relevant fine print clause data structures one of three default fields, including: a "Show-By-Default" field, a "Select-By-Default" field, and a "Required-By-Default" field, wherein the default fields indicate default rules for configuring the relevant fine print clause data structures for a given promotion, wherein if the "Show-By-Default" field is true, then the fine print clause stored in the data structure will be shown to the user via the user interface for the user's selection, if the "Select-By-Default" field is true, then the fine print clause stored in the data structure will be shown to the user for selection, but will also be automatically selected, and therefore will be included in the fine print for the promotion unless the user specifically deselects the fine print clause, and if the "Required-By-Default" field is true, then the fine print clause stored in the data structure will be shown to the user, selected for inclusion in the fine print for the promotion, and will not be de-selectable;

transmit the relevant fine print clause data structures to the user device, configured for display in accordance with a respective impact of the given fine print clause on promotion performance;

receive, from the user device, the configured fine print data structure for the promotion based on the transmitted relevant fine print clause data structures, wherein the promotion is generated for display by the promotion and marketing service; and generate, by the processor, in real-time, a promotion including a fine print string based on the configured fine print data structure.

6. The apparatus of claim 5, wherein the computer program code, when executed by the processor, further causes the apparatus to:

retrieve from the one or more mapping data structures, for each fine print clause data structure, presentation information indicating whether a fine print clause associated with the fine print clause data structure is required for the promotion, selected for inclusion in the promotion, or should be shown to a user for selection, wherein transmitting the relevant fine print clause data structures to the user device includes transmitting the presentation information for each fine print clause data structure.

7. The apparatus of claim 5, wherein at least one fine print clause data structure includes configurable text.

8. The apparatus of claim 5, wherein each fine print clause data structure includes fields indicating default instructions regarding whether an associated fine print clause is required for the promotion, selected for inclusion in the promotion, or should be shown to a user for selection.

9. A computer program product for machine learning to programmatically select and transmit relevant fine print clause data structures to a user device to facilitate user definition of configured fine print data structures for a promotion, the computer program product comprising a non-transitory computer-readable storage medium storing computer program code that, when executed by an apparatus, causes the apparatus to:

receive, from the user device, information identifying one or more locations at which a customer may redeem the promotion and either a product or a service for which the promotion may be redeemed;

automatically identifying and dynamically generating, based on the received information, the relevant fine print clause data structures stored in a memory, wherein fine print clause data comprises legal and contractual parameters that outline a term, timing, and constraints for how and when a promotion may be redeemed, and further comprise limitations on liability, conditions for eligibility, and warnings that a merchant places on a promotion, and further comprises an indication that the promotion must be redeemed prior to a specified deadline, for a specific good, service or experience, wherein the automatically identifying and dynamically generating of the relevant fine print clause data structures comprises:

searching the memory for one or more mapping data structures associated with the location and either the product or the service;

receiving search results comprising the one or more mapping data structures;

retrieving the fine print clause data structures listed in the one or more mapping data structures;

determining a causal relationship between the retrieved fine print clause data structures and performance of promotions to which the retrieved fine print clause data structure have been applied to determine an impact of a given fine print clause on promotion performance, wherein the determining of the impact of the given fine print clause on promotion performance comprises:

querying a historical database to retrieve a historical set of previously offered promotions, searching the associated fine print for certain phrases from the fine print clause data structure, and flagging each historical promotion as containing or not containing the phrases included in the fine print clause data structure; and applying a multivariable linear regression model, including the fine print clauses and other deal parameters including at least a location and a merchant quality, to determine the impact of a given fine print clause on deal performance;

selecting the relevant fine print clause data structures based on the determined impacts; and assigning, based on the determined impact of the given fine print clause on promotion performance, each of the selected relevant fine print clause data structures one of three default fields, including: a "Show-By-Default" field, a "Select-By-Default" field, and a "Required-By-Default" field, wherein the default fields indicate default rules for configuring the relevant fine print clause data structures for a given promotion, wherein if the "Show-By-Default" field is true, then the fine print clause stored in the data structure will be shown to the user via the user interface for the user's selection, if the "Select-By-Default" field is true, then the fine print clause stored in the data structure will be shown to the user for selection, but will also be automatically selected, and therefore will be included in the fine print for the promotion unless the user specifically deselects the fine print clause, and if the "Required-By-Default" field is true, then the fine print clause stored in the data structure will be shown to the user, selected for inclusion in the fine print for the promotion, and will not be de-selectable;

transmit the relevant fine print clause data structures to the user device, configured for display in accordance with a respective impact of the given fine print clause on promotion performance;

receive, from the user device, the configured fine print data structure for the promotion based on the transmitted relevant fine print clause data structures, wherein the promotion is generated for display by the promotion and marketing service; and generating, by the processor, in real-time, a promotion including a fine print string based on the configured fine print data structure.

10. The computer program product of claim 9, wherein the computer program code, when executed by the apparatus, further causes the apparatus to:

retrieve from the one or more mapping data structures, for each fine print clause data structure, presentation information indicating whether a fine print clause associated with the fine print clause data structure is required for the promotion, selected for inclusion in the promotion, or should be shown to a user for selection, wherein transmitting the relevant fine print clause data structures to the user device includes transmitting the presentation information for each fine print clause data structure.

11. The computer program product of claim 9, wherein at least one fine print clause data structure includes configurable text.

12. The computer program product of claim 9, wherein each fine print clause data structure includes fields indicating default instructions regarding whether an associated fine print clause is required for the promotion, selected for inclusion in the promotion, or should be shown to a user for selection.

* * * * *